US012712775B2

(12) United States Patent
Gong et al.

(10) Patent No.: US 12,712,775 B2
(45) Date of Patent: Aug. 18, 2026

(54) CARRIER SIGNAL PROCESSING METHOD, COMMUNICATION APPARATUS, AND COMMUNICATION SYSTEM

(71) Applicant: HUAWEI TECHNOLOGIES CO., LTD., Shenzhen (CN)

(72) Inventors: Zhengwei Gong, Shanghai (CN); Yongchao Pan, Shanghai (CN); Shiguo Guan, Shanghai (CN); Jie Lin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 578 days.

(21) Appl. No.: 18/321,786

(22) Filed: May 23, 2023

(65) Prior Publication Data

US 2023/0291628 A1 Sep. 14, 2023

Related U.S. Application Data

(63) Continuation of application No. PCT/CN2021/133889, filed on Nov. 29, 2021.

(30) Foreign Application Priority Data

Nov. 30, 2020 (CN) ......................... 202011380681.0
Mar. 31, 2021 (CN) ........................ 202110351677.X

(51) Int. Cl.

| | |
|---|---|
| ***H04W 4/00*** | (2018.01) |
| ***H04L 27/26*** | (2006.01) |
| ***H04W 72/12*** | (2023.01) |
| *H04L 5/00* | (2006.01) |

(52) U.S. Cl.
CPC ......... *H04L 27/2623* (2013.01); *H04W 72/12* (2013.01); *H04L 5/001* (2013.01)

(58) Field of Classification Search
None
See application file for complete search history.

(56) References Cited

U.S. PATENT DOCUMENTS 9,479,374 B1 * 10/2016 Shor .................. H04L 27/2614
2010/0020895 A1 * 1/2010 Jiang .................. H04L 27/2623 375/295
2017/0302490 A1 * 10/2017 Qiu .................. H04W 72/0453
(Continued)

FOREIGN PATENT DOCUMENTS

CN 1538650 A 10/2004
CN 101136890 A 3/2008
(Continued)

*Primary Examiner* — Bob A Phunkulh

(57) ABSTRACT

This disclosure provides a carrier signal processing method and apparatus. In the method, clipping factors are determined based on scheduling information corresponding to at least two respective carrier signals in a first time unit, the clipping factors correspond to the at least two respective carrier signals in the first time unit and are used for clipping processing a combination signal of the at least two carrier signals in the first time unit. The at least two carrier signals and the clipping factors are sent to a radio unit for processing. In this solution, clipping factors are matched in real time with scheduling information respectively corresponding to a plurality of carrier signals in the first time unit, to improve clipping performance.

20 Claims, 6 Drawing Sheets

(56) References Cited

U.S. PATENT DOCUMENTS

| | | | | |
|---|---|---|---|---|
| 2017/0373890 | A1* | 12/2017 | Fertonani | H04L 25/02 |
| 2018/0295008 | A1* | 10/2018 | Yao | H04L 5/001 |
| 2019/0229760 | A1* | 7/2019 | Jiang | H04B 1/04 |
| 2019/0280730 | A1* | 9/2019 | Zhang | H04B 1/0458 |

FOREIGN PATENT DOCUMENTS

| | | | |
|---|---|---|---|
| CN | 100490430 | C | 5/2009 |
| CN | 100550627 | C | 10/2009 |
| CN | 101848182 | A | 9/2010 |
| CN | 102098255 | A | 6/2011 |
| CN | 102223338 | A | 10/2011 |
| CN | 102571680 | A | 7/2012 |
| CN | 103001907 | A | 3/2013 |
| CN | 103312655 | A | 9/2013 |
| CN | 104601511 | A | 5/2015 |
| CN | 105684338 | A | 6/2016 |
| CN | 107005513 | B | 3/2019 |
| CN | 110268684 | A | 9/2019 |
| CN | 110650106 | A | 1/2020 |
| CN | 108293032 | B | 7/2020 |
| EP | 2485447 | A1 | 8/2012 |
| WO | 2016001781 | A1 | 1/2016 |

* cited by examiner 810
820
800
Transceiver unit
Processing unit

CARRIER SIGNAL PROCESSING METHOD, COMMUNICATION APPARATUS, AND COMMUNICATION SYSTEM

CROSS-REFERENCE TO RELATED APPLICATIONS

This application is a continuation of International Application No. PCT/CN2021/133889, filed on Nov. 29, 2021, which claims priority to Chinese Patent Application No. 202011380681.0, filed on Nov. 30, 2020 and Chinese Patent Application No. 202110351677.X, filed on Mar. 31, 2021. All of the aforementioned patent applications are hereby incorporated by reference in their entireties.

TECHNICAL FIELD

This disclosure relates to the field of communication technologies, and in particular, to a carrier signal processing method, a communication apparatus, and a communication system.

BACKGROUND

In a wireless communication system, a carrier signal that needs to be sent is usually processed by a baseband module, a digital-to-analog/analog-to-digital conversion module, a radio frequency module, and the like, and then sent by an antenna unit. In a signal processing process, performance indicators in different dimensions are usually introduced to represent related performance of a signal, such as a security performance indicator, a demodulation performance indicator, a power amplification performance indicator, a clipping performance indicator, and an indicator representing a non-linear distortion degree. In a system design process, a plurality of performance indicators usually need to be considered to ensure communication quality.

A power amplifier (power amplifier, PA) unit in a radio frequency module is responsible for amplifying power of a signal, and power amplification performance is very sensitive to an amplitude change of the signal. Usually, the power amplification performance is related to a peak-to-average power ratio (peak-to-average power ratio, PAPR) of the signal, and the peak-to-average power ratio is a ratio of a peak power of the signal to an average power of the signal. If an instantaneous peak value of a signal whose PAPR is excessively large exceeds a peak value bearing capability of the power amplifier unit, the power amplifier unit may be burnt. In a possible solution, a sent signal is clipped by using a clipping technology to reduce a PAPR value of the signal to a specific range, to ensure security of the power amplifier unit. However, the clipping technology introduces non-linear distortion to the signal. Usually, an error vector magnitude (error vector magnitude, EVM) of the signal may be for representing a non-linear distortion degree. An EVM indicator corresponds to a modulation order (modulation order, MO) of a signal. For example, an upper limit of a quadrature phase shift keying (quadrature phase shift keying, QPSK) EVM is 15%, an upper limit of a 16 quadrature amplitude modulation (quadrature amplitude modulation, QAM) EVM is 11%, and an upper limit of a 256QAM EVM is 3.5%. A larger EVM indicates higher distortion, which affects communication performance.

In a scenario of a plurality of carrier signals, a clipping technology has large impact on communication performance.

SUMMARY

This disclosure provides a carrier signal processing method, a communication apparatus, and a communication system, to resolve a problem of communication performance deterioration caused by clipping of a plurality of carrier signals.

According to a first aspect, an embodiment of this application provides a carrier signal processing method. The method is applied to a baseband unit or a part (such as a chip or a processor) in the baseband unit. The method includes: determining, based on scheduling information respectively corresponding to at least two carrier signals in a first time unit, clipping factors respectively corresponding to the at least two carrier signals in the first time unit; and sending the at least two carrier signals and the clipping factors respectively corresponding to the at least two carrier signals in the first time unit to a radio unit, where the clipping factors respectively corresponding to the at least two carrier signals in the first time unit are for clipping processing on a combined signal of the at least two carrier signals.

Based on this solution, clipping factors respectively corresponding to a plurality of carrier signals in the first time unit are determined at a time unit granularity, and the clipping factors respectively corresponding to the plurality of carrier signals in the first time unit are sent to the radio unit. In this way, the radio unit can complete clipping at the time unit granularity, to ensure clipping performance, thereby resolving a problem of communication performance deterioration caused by clipping of the plurality of carrier signals. In addition, the baseband unit sends the clipping factors respectively corresponding to the plurality of carrier signals in the first time unit to the radio unit, to reduce load of a transmission interface.

The baseband unit may or may not send the scheduling information respectively corresponding to the at least two carrier signals in the first time unit to the radio unit. If the baseband unit does not send the scheduling information to the radio unit, the load of the transmission interface can be further reduced.

In a possible implementation method, the determining, based on scheduling information respectively corresponding to at least two carrier signals in a first time unit, clipping factors respectively corresponding to the at least two carrier signals in the first time unit includes: determining a reference carrier signal in the at least two carrier signals; and determining, based on the scheduling information corresponding to each of the at least two carrier signals in the first time unit and scheduling information corresponding to the reference carrier signal in the first time unit, the clipping factor corresponding to each carrier signal.

Based on the foregoing solution, a difference between scheduling information of carrier signals is considered, and a clipping factor corresponding to each carrier signal in the first time unit can be accurately determined based on the scheduling information of the carrier signals. This helps ensure clipping performance, and further ensure communication performance after clipping of a multi-carrier signal. In some optional implementations, impact of different carrier bandwidths and/or powers on clipping performance is considered, for example, impact on an EVM indicator.

According to a second aspect, an embodiment of this application provides a carrier signal processing method. The method is applied to a radio unit or a part (such as a chip or a processor) in the radio unit. The method includes: receiving at least two carrier signals and clipping factors respectively corresponding to the at least two carrier signals in a first time unit from a baseband unit, where the clipping factors respectively corresponding to the at least two carrier signals in the first time unit correspond to scheduling information respectively corresponding to the at least two carrier signals in the first time unit; and performing clipping processing on a combined signal of the at least two carrier signals based on the clipping factors respectively corresponding to the at least two carrier signals in the first time unit.

Based on this solution, clipping factors respectively corresponding to a plurality of carrier signals in the first time unit are determined at a time unit granularity, and the clipping factors respectively corresponding to the plurality of carrier signals in the first time unit are sent to the radio unit. In this way, the radio unit can complete clipping at the time unit granularity, to ensure clipping performance, thereby resolving a problem of communication performance deterioration caused by clipping of the plurality of carrier signals. In addition, the baseband unit sends the clipping factors respectively corresponding to the plurality of carrier signals in the first time unit to the radio unit, to reduce load of a transmission interface.

The baseband unit may or may not send the scheduling information respectively corresponding to the at least two carrier signals in the first time unit to the radio unit. If the baseband unit does not send the scheduling information to the radio unit, the load of the transmission interface can be further reduced.

In a possible implementation method, before the performing clipping processing on a combined signal of the at least two carrier signals based on the clipping factors respectively corresponding to the at least two carrier signals in the first time, the method further includes: determining that transmission of the clipping factors is reliable.

In the foregoing solution, reliability of a clipping factor transmitted on an interface is determined based on a distributed architecture, so that clipping reliability can be ensured, and a problem of communication performance deterioration caused by clipping of a multi-carrier signal can be resolved.

In a possible implementation method, if transmission of the clipping factors is unreliable, clipping processing on the combined signal of the at least two carrier signals is canceled, and/or sending of the combined signal of the at least two carrier signals is canceled.

Based on any implementation method of the first aspect or any implementation method of the second aspect:

In a possible implementation method, the first time unit is a slot, a subframe, or an orthogonal frequency division multiplexing symbol.

In a possible implementation method, the scheduling information includes one or more of a power, a modulation order, and a bandwidth.

Based on the foregoing solution, when the clipping factor is determined, factors such as a power, a modulation order, and a bandwidth in the scheduling information may be referred to. This helps ensure accuracy of the clipping factor, and further ensures clipping reliability, thereby resolving a problem of communication performance deterioration caused by clipping of a multi-carrier signal.

In a possible implementation method, an association relationship between the clipping factor and a parameter in the scheduling information is a function or a table. Based on the foregoing solution, according to the function or the table, a clipping factor corresponding to a carrier signal may be determined based on a parameter in scheduling information corresponding to the carrier signal.

In a possible implementation method, the association relationship between the clipping factor and the parameter in the scheduling information may be:

$$F_i = P_j / P_i,$$

$$F_i = (P_j^* EVM_j^2)/(P_i^* EVM_i^2),\ F_i = (P_j^* EVM_j^2 * k_{BW_1})/(P_i * EVM_i^2 * k_{BW_i}),$$

$$F_i = (EVM_j^2 * k_{BW_1})/(EVM_i^2 * k_{BW_i}),\ F_i = EVM_j^2 / EVM_i^2,\ F_i = k_{BW_j} / k_{BW_i},\ \text{or}$$

$$F_i = (P_j * k_{BW_j})/(P_i * k_{BW_i}),$$

where F represents a clipping factor corresponding to an $i^{th}$ carrier signal in the at least two carrier signals in the first time unit, $P_i$ represents a power of the $i^{th}$ carrier signal in the first time unit, $P_i$ represents a power of a $j^{th}$ carrier signal in the first time unit, $EVM_i$ represents an error vector magnitude EVM threshold corresponding to a modulation order of the $i^{th}$ carrier signal in the first time unit, $EVM_j$ represents an error vector magnitude EVM threshold corresponding to a modulation order of the $j^{th}$ carrier signal in the first time unit, $BW_i$ represents a bandwidth of the $i^{th}$ carrier signal in the first time unit, $BW_i$ represents a bandwidth of the $j^{th}$ carrier signal in the first time unit $$k_{BW_i}$$

represents a clipping correction factor corresponding to the $i^{th}$ carrier signal in the first time unit, $$k_{BW_i}$$

is related to the bandwidth of the $i^{th}$ carrier signal in the first time unit, $$k_{BW_i}$$

represents a clipping correction factor corresponding to the $j^{th}$ carrier signal in the first time unit, $$k_{BW_i}$$

is related to the bandwidth of the $j^{th}$ carrier signal in the first time unit, the $j^{th}$ carrier signal is the reference carrier signal, and a quantity of the at least two carrier signals is n, where i=1, 2, . . . , n.

According to a third aspect, an embodiment of this application provides a carrier signal processing method. The method is applied to a baseband unit or a part (such as a chip or a processor) in the baseband unit. The method includes: determining, based on scheduling information respectively corresponding to at least two carrier signals in a first time unit and second clipping factors respectively corresponding to the at least two carrier signals in a second time unit, first clipping factors respectively corresponding to the at least two carrier signals in the first time unit, where the first time unit is included in the second time unit; performing separate clipping processing on each of the at least two carrier signals based on the first clipping factors respectively corresponding to the at least two carrier signals in the first time unit; and sending at least two clipping-processed carrier signals to a radio unit, where the second clipping factors are for performing clipping processing on a combined signal of the at least two clipping-processed carrier signals.

In the foregoing solution, the baseband unit first performs, based on a first clipping factor corresponding to each carrier signal in the first time unit, separate clipping processing on each carrier signal for a first time, and then sends a carrier signal obtained through the first-time clipping to the radio unit. The radio unit performs, based on a second clipping factor, clipping processing on a combined signal of clipped carrier signals for a second time, to obtain a carrier signal obtained through the second-time clipping. The method is a two-level clipping processing solution based on a combination of real-time clipping by the baseband unit and semi-persistent clipping by the radio unit, where clipping performance thereof can approximate or exceed real-time clipping performance of the radio unit, thereby resolving a problem of communication performance deterioration caused by clipping of a plurality of carrier signals. In addition, the two-level clipping solution is insensitive to a reliability change of transmission through an intermediate interface, and therefore is more flexible in use.

In a possible implementation method, the determining, based on scheduling information respectively corresponding to at least two carrier signals in a first time unit and second clipping factors respectively corresponding to the at least two carrier signals in a second time unit, first clipping factors respectively corresponding to the at least two carrier signals in the first time unit includes: determining a reference carrier signal in the at least two carrier signals; and determining, based on the scheduling information corresponding to each of the at least two carrier signals in the first time unit, scheduling information corresponding to the reference carrier signal in the first time unit, and the second clipping factors respectively corresponding to the at least two carrier signals in the second time unit, the first clipping factor corresponding to each carrier signal.

Based on the foregoing solution, a difference between scheduling information of carrier signals is considered, and a clipping factor corresponding to each carrier signal in the first time unit can be accurately determined based on the scheduling information of the carrier signals. This helps ensure clipping performance, and further ensure communication performance after clipping of a multi-carrier signal.

In a possible implementation method, the second clipping factors respectively corresponding to the at least two carrier signals in the second time unit are received from the radio unit.

Based on this solution, the radio unit determines the second clipping factors, to reduce calculation overheads of the baseband unit.

In a possible implementation method, the second clipping factor corresponding to each carrier signal in the second time unit is determined.

Based on this solution, the baseband unit determines the second clipping factors, to reduce calculation overheads of the radio unit.

In a possible implementation method, that the second clipping factor corresponding to each carrier signal in the second time unit is determined includes: determining, based on a plurality of third clipping factors corresponding to each of the at least two carrier signals in a third time unit, the second clipping factor corresponding to each carrier signal in the second time unit, where the third time unit is earlier than the second time unit in a time sequence.

In a possible implementation method, that the second clipping factor corresponding to each carrier signal in the second time unit is determined includes: determining, based on a plurality of first clipping factors corresponding to each of the at least two carrier signals in the second time unit, the second clipping factor corresponding to each carrier signal in the second time unit, where the second time unit includes a plurality of first time units.

Optionally, the second clipping factor is determined based on statistical values or extreme values of a plurality of clipping factors. Optionally, an average value or a maximum value of a plurality of first clipping factors corresponding to each carrier signal in the first time unit is determined as the second clipping factor corresponding to the carrier signal in the second time unit.

Optionally, an average value or a maximum value of a plurality of third clipping factors corresponding to each carrier signal in the third time unit is determined as the second clipping factor corresponding to the carrier signal in the second time unit. In a possible implementation method, the second clipping factors respectively corresponding to the at least two carrier signals in the second time unit are sent to the radio unit.

According to a fourth aspect, an embodiment of this application provides a carrier signal processing method. The method is applied to a radio unit or a part (such as a chip or a processor) in the radio unit. The method includes: receiving at least two clipping-processed carrier signals from a baseband unit, where the at least two clipping-processed carrier signals are carrier signals obtained by performing separate clipping processing based on first clipping factors respectively corresponding to at least two carrier signals in a first time unit, and the first clipping factors are determined based on scheduling information respectively corresponding to the at least two carrier signals in the first time unit and second clipping factors respectively corresponding to the at least two carrier signals in a second time unit, where the first time unit is included in the second time unit; and performing clipping processing on a combined signal of the at least two clipping-processed carrier signals based on the second clipping factors respectively corresponding to the at least two carrier signals in the second time unit.

In the foregoing solution, the baseband unit first performs, based on a first clipping factor corresponding to each carrier signal in the first time unit, separate clipping processing on each carrier signal for a first time, and then sends a carrier signal obtained through the first-time clipping to the radio unit. The radio unit performs, based on a second clipping factor, clipping processing on a combined signal of clipped carrier signals for a second time, to obtain a carrier signal obtained through the second-time clipping. The method is a two-level clipping processing solution based on a combination of real-time clipping by the baseband unit and semi-persistent clipping by the radio unit, where clipping performance thereof can approximate or exceed real-time clipping performance of the radio unit, thereby resolving a problem of communication performance deterioration caused by clipping of a plurality of carrier signals. In addition, the two-level clipping solution is insensitive to a reliability change of transmission through an intermediate interface, and therefore is more flexible in use.

In a possible implementation method, the second clipping factor corresponding to each carrier signal in the second time unit is determined.

Based on this solution, the radio unit determines the second clipping factors, to reduce calculation overheads of the baseband unit.

In a possible implementation method, that the second clipping factor corresponding to each carrier signal in the second time unit is determined includes: determining, as the second clipping factor corresponding to each carrier signal in the second time unit, an average value or a maximum value of a plurality of third clipping factors corresponding to each of the at least two carrier signals in a third time unit, where the third time unit is earlier than the second time unit in a time sequence.

In a possible implementation method, before the at least two clipping-processed carrier signals are received from the baseband unit, the second clipping factors respectively corresponding to the at least two carrier signals in the second time unit are sent to the baseband unit.

In a possible implementation method, that the second clipping factor corresponding to each carrier signal in the second time unit is determined includes: determining, based on a plurality of first clipping factors corresponding to each of the at least two carrier signals in the second time unit, the second clipping factor corresponding to each carrier signal in the second time unit, where the second time unit includes a plurality of first time units.

Optionally, scheduling information that is corresponding to the second time unit and that is sent by the baseband unit is received. Optionally, the scheduling information corresponding to the second time unit is pre-sent or sent in advance.

Optionally, the second clipping factor is determined based on statistical values or extreme values of a plurality of clipping factors. Optionally, an average value or a maximum value of a plurality of first clipping factors corresponding to each carrier signal in the first time unit is determined as the second clipping factor corresponding to the carrier signal in the second time unit.

In a possible implementation method, the second clipping factors respectively corresponding to the at least two carrier signals in the second time unit are received from the baseband unit.

Based on this solution, the baseband unit determines the second clipping factors, to reduce calculation overheads of the radio unit.

Based on any implementation method of the third aspect or any implementation method of the fourth aspect:

In a possible implementation method, the first time unit is a slot, a subframe, or an orthogonal frequency division multiplexing symbol.

In a possible implementation method, the scheduling information includes at least one of a power, a modulation order, and a bandwidth.

Based on the foregoing solution, when the clipping factor is determined, factors such as a power, a modulation order, and a bandwidth in the scheduling information may be referred to. This helps ensure accuracy of the clipping factor, and further ensures clipping reliability, thereby resolving a problem of communication performance deterioration caused by clipping of a multi-carrier signal.

In a possible implementation method, an association relationship between the first clipping factor and a parameter in the scheduling information is a function or a table. Based on the foregoing solution, according to the function or the table, a clipping factor corresponding to a carrier signal may be determined based on a parameter in scheduling information corresponding to the carrier signal.

In a possible implementation method, the association relationship between the first clipping factor and the parameter in the scheduling information may be $$F_{i,j}^1 = P_{k,j}^1/P_{i,j}^1/F_i^2;\ F_{i,j}^1 = \left(EVM_{k,j}^1\right)^2/\left(EVM_{i,j}^1\right)^2/F_i^2;$$

$$或\ F_{i,j}^1 = \left(P_{k,j}^1 * \left(EVM_{k,j}^1\right)^2\right)/\left(P_{i,j}^1 * \left(EVM_{i,j}^1\right)^2\right)/F_i^2,$$

where F represents a first clipping factor corresponding to an $i^{th}$ carrier signal in the at least two carrier signals in a $j^{th}$ first time unit in the second time unit, $$F_i^2$$

represents a second clipping factor corresponding to the $i^{th}$ carrier signal in the second time unit, $$P_{i,j}^1$$

represents a power of the $i^{th}$ carrier signal in the $j^{th}$ first time unit in the second time unit, $$P_{k,j}^1$$

represents a power of a $k^{th}$ carrier signal in the $j^{th}$ first time unit in the second time unit, $$EVM_{i,j}^1$$

represents an EVM threshold corresponding to a modulation order of the $i^{th}$ carrier signal in the $j^{th}$ first time unit in the second time unit, $$EVM_{k,j}^1$$

represents an EVM threshold corresponding to a modulation order of the $k^{th}$ carrier signal in the $j^{th}$ first time unit in the second time unit, and the $k^{th}$ carrier signal is the reference carrier signal, where i=1, 2, . . . , n, and j=1, 2, . . . , m.

According to a fifth aspect, an embodiment of this application provides a carrier signal processing method, including: determining peak-valley information of at least two carrier signals in time domain, where the peak-valley information includes peak information and/or valley information; determining offsets of the at least two carrier signals in time domain based on the peak-valley information of the at least two carrier signals in time domain; determining at least two adjusted carrier signals based on the offsets of the at least two carrier signals in time domain; and sending the at least two adjusted carrier signals to a radio unit.

In the foregoing solution, a baseband unit may reduce a PAPR based on relative shifts of a plurality of carrier signals in time domain, thereby resolving a problem of communication performance deterioration caused by clipping of the plurality of carrier signals. In addition, when this solution is combined with clipping processing, clipping pressure can be reduced, and a compromise between security of a power amplifier unit and an EVM indicator of a system can be better implemented.

In a possible implementation method, the determining at least two adjusted carrier signals includes reducing peak superposition and/or valley superposition of the at least two carrier signals.

In a possible implementation method, peak superposition and/or valley superposition do/does not exist on or peak superposition and/or valley superposition are/is reduced for any two of the at least two adjusted carrier signals.

In a possible implementation method, the determining offsets of the at least two carrier signals in time domain based on the peak-valley information of the at least two carrier signals in time domain includes: determining a reference carrier signal in the at least two carrier signals; and determining, based on peak-valley information of the reference carrier signal, an offset of a non-reference carrier signal in the at least two carrier signals relative to the reference carrier signal in time domain.

According to a sixth aspect, an embodiment of this application provides a communication apparatus. The apparatus may be a baseband unit, or may be a chip used in the baseband unit. The apparatus has a function of implementing the implementations of the first aspect, the third aspect, or the fifth aspect. The function may be implemented by hardware, or may be implemented by hardware executing corresponding software. The hardware or the software includes one or more modules corresponding to the function.

According to a seventh aspect, an embodiment of this application provides a communication apparatus. The apparatus may be a radio unit, or may be a chip used in the radio unit. The apparatus has a function of implementing the implementations of the second aspect or the fourth aspect. The function may be implemented by hardware, or may be implemented by hardware executing corresponding software. The hardware or the software includes one or more modules corresponding to the function.

According to an eighth aspect, an embodiment of this application provides a communication apparatus, including a processor and a memory. The memory is configured to store computer-executable instructions. When the apparatus runs, the processor executes the computer-executable instructions stored in the memory, to enable the apparatus to perform the implementation methods of the first aspect to the fifth aspect.

According to a ninth aspect, an embodiment of this application provides a communication apparatus, including a unit or means (means) configured to perform the steps in the implementation methods of the first aspect to the fifth aspect.

According to a tenth aspect, an embodiment of this application provides a communication apparatus, including a processor and an interface circuit. The processor is configured to communicate with another apparatus through the interface circuit, and perform the implementation methods of the first aspect to the fifth aspect. There are one or more processors.

According to an eleventh aspect, an embodiment of this application provides a communication apparatus, including a processor, connected to a memory, and configured to invoke a program stored in the memory, to perform the implementation methods of the first aspect to the fifth aspect. The memory may be located inside or outside the apparatus. There are one or more processors.

According to a twelfth aspect, an embodiment of this application further provides a computer-readable storage medium. The computer-readable storage medium stores instructions. When the instructions are run on a computer, the implementation methods of the first aspect to the fifth aspect are performed.

According to a thirteenth aspect, an embodiment of this application further provides a computer program product. The computer product includes a computer program. When the computer program is run, the implementation methods of the first aspect to the fifth aspect are performed.

According to a fourteenth aspect, an embodiment of this application further provides a chip system, including: a processor, configured to perform the implementation methods of the first aspect to the fifth aspect.

According to a fifteenth aspect, an embodiment of this application further provides a communication system, including a baseband unit configured to perform any implementation method of the first aspect and/or a radio unit configured to perform any implementation method of the second aspect.

According to a sixteenth aspect, an embodiment of this application further provides a communication system, including a baseband unit configured to perform any implementation method of the third aspect and/or a radio unit configured to perform any implementation method of the fourth aspect.

According to a seventeenth aspect, an embodiment of this application further provides a communication system, including a baseband unit configured to perform any implementation method of the fifth aspect and/or a radio unit configured to receive at least two adjusted carrier signals from the baseband unit.

DESCRIPTION OF EMBODIMENTS

Figure 1:
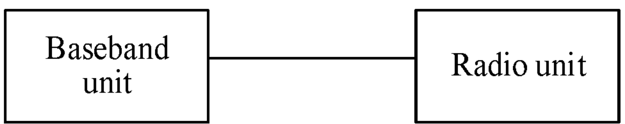
FIG. 1 shows a distributed architecture in which a baseband unit and a radio unit are separated.

In embodiments of this application, "at least two" means two or more. "at least two" may also be expressed as "a plurality of" below, and they have a same meaning. This is uniformly described herein, and details are not described below again.

The following describes terms and concepts in embodiments of this application.

1. Carrier

A carrier (carrier wave, carrier signal or carrier) is a physical concept, and is a radio wave of a specific frequency.

In a communication technology, a carrier is an electromagnetic wave generated by an oscillator and transmitted on a communication channel, and is modulated to transmit voice or other information. On a wireless channel, information is usually transmitted by using a carrier. A digital signal is modulated (converted) to a high-frequency carrier (because a higher frequency indicates a longer transmission distance), and then transmitted and received in the air.

2. Carrier Signal, Baseband Signal, and Radio Frequency Signal

A carrier signal may be understood as a signal corresponding to a system bandwidth, for example, a signal corresponding to a bandwidth of 5 MHz/10 MHz/20 MHz. A signal formed by a plurality of adjacent 5 MHz/10 MHz/20 MHz is a multi-carrier signal. For example, the first carrier signal with a 10 MHz bandwidth spans frequencies [−5, 5], and the second adjacent carrier signal with a 20 MHz bandwidth spans frequencies [−5, 25].

A baseband signal is a signal processed by a baseband unit (baseband unit, BBU). The baseband signal is usually a digital signal. If a baseband signal needs to be propagated by using an electromagnetic wave, the baseband signal needs to be modulated to, for example, 700 MHz or 2100 MHz. This modulation process is usually implemented by a radio frequency component. To be specific, a baseband signal corresponding to a single carrier or a plurality of carriers is moved to a center frequency of 700 MHz or 2100 MHz.

A radio frequency signal is a signal processed by a radio unit (radio unit, RU). The radio frequency signal is usually an analog signal.

A relationship between the carrier signal, the baseband signal, and the radio frequency signal is as follows: The carrier signal is a representation of a signal in a frequency domain dimension. The baseband signal represents that a hardware processing entity of the carrier signal is the baseband unit. The radio frequency signal represents that a hardware processing entity of the carrier signal is the radio unit. The baseband signal and the radio frequency signal may be mutually converted by using some components such as an analog-to-digital conversion component.

In embodiments of this application, a plurality of carrier signals are also referred to as a multi-carrier signal, at least two carrier signals, or signals respectively corresponding to a plurality of carriers, are carrier signals that are multiplexed by using a modulation technology in a plurality of channels of communication, and include two or more carrier signals.

3. Time Unit

In embodiments of this application, for example, a time unit is a unit corresponding to a unit of time. The unit of time is a unit of time or a unit of scheduling for information transmission in time domain and/or frequency domain. For example, the time unit (such as a first time unit, a second time unit, a third time unit, or a fourth time unit) may be a slot (slot), a subframe (subframe), or an orthogonal frequency division multiplexing (orthogonal frequency division multiplexing, OFDM) symbol, may be a slot (slot), may be a radio frame, a mini slot (mini slot or sub slot), a plurality of aggregated slots, or a plurality of aggregated subframes or symbols, or may be a transmission time interval (transmission time interval, TTI). This is not limited in this application. One or more time units of a type of unit of time may include an integer quantity of time units of another type of unit of time in time domain, or a length of one or more time units of a type of unit of time is equal to a sum of lengths of an integer quantity of time units of another type of unit of time in time domain. For example, a mini-slot/slot/subframe/radio frame includes an integer quantity of symbols, a slot/subframe/radio frame includes an integer quantity of mini-slots, a subframe/radio frame includes an integer quantity of slots, a radio frame includes an integer quantity of subframes, and the like, and there may be also another example of an including relationship. This is not limited in this application.

In this application, different time units may be distinguished, marked, or counted by using indexes, identifiers, or other means.

4. Scheduling Information

In embodiments of this application, the scheduling information is information for scheduling a carrier signal. For example, the scheduling information includes one or more of a power, a modulation order, or a bandwidth. Herein, the power may be a transmit power of the carrier signal, the modulation order may be, for example, QPSK, 16QAM, or 256QAM, and the bandwidth may be a bandwidth occupied by the carrier signal. It should be noted that the scheduling information in embodiments of this application is not limited to the power, the bandwidth, or the modulation order. During actual application, the scheduling information may be other information for scheduling a carrier signal.

In embodiments of this application, one carrier signal corresponds to one piece of scheduling information in one time unit. For example, scheduling information corresponding to a carrier signal in a time unit is scheduling information for scheduling the carrier signal in the time unit. In a case of a plurality of carrier signals, scheduling information respectively corresponding to the plurality of carrier signals in one time unit may also be expressed as scheduling information respectively corresponding to the plurality of carrier signals that are in the time unit, that is, each carrier signal corresponds to one piece of scheduling information.

The scheduling information may be for calculating a clipping factor of a carrier signal. For example, a clipping factor corresponding to each of a plurality of carrier signals may be calculated based on powers respectively corresponding to the plurality of carrier signals. For another example, a clipping factor corresponding to each of a plurality of carrier signals may be calculated based on powers and/or bandwidths respectively corresponding to the plurality of carrier signals.

5. Clipping, Clipping Noise, and Clipping Factor

If an instantaneous peak value of a signal whose PAPR is excessively large exceeds a peak bearing capability of a power amplifier unit, the power amplifier unit may be burnt. Therefore, in an actual system, a clipping technology needs to be used to clip a sent signal, to reduce a PAPR value of the signal to a specific range, thereby ensuring security of the power amplifier unit. That is, clipping processing needs to be performed on the signal before power amplification.

For example, clipping refers to performing amplitude limitation on a signal whose amplitude fluctuation exceeds a threshold when an amplitude of the signal fluctuates in time domain or frequency domain, and is similar to performing a reduction action on a “peak” part of a fluctuation signal. Implementing reduction on the “peak” part of the signal is similar to adding a part of “peak cancellation” signal to the signal in a “peak” area, and essentially, the part of “peak cancellation” signal may be defined as clipping noise. A factor of the clipping noise is referred to as a “clipping factor”.

The clipping factor may be understood as a proportion of clipping noise borne by each different carrier. Compared with a proportion, namely, 1, of a basic carrier (or referred to as a reference carrier), a value of another carrier may be greater than, equal to, or less than 1. For example, if a clipping factor of carrier A is greater than 1, it indicates that carrier A bears more clipping noise than the basic carrier; if a clipping factor of carrier B is equal to 1, it indicates that carrier B bears less clipping noise than the basic carrier; and if a clipping factor of carrier C is 1, it indicates that carrier C bears the same clipping noise as the basic carrier. It is easy to understand that the clipping factor may also be referred to as a clipping parameter, a clipping coefficient, a clipping ratio, or the like.

For example, performing separate clipping on each carrier signal means that a clipping object is a signal corresponding to a single carrier. For another example, clipping a combined signal of a plurality of carrier signals means that a clipping object is a mixed signal of signals respectively corresponding to the plurality of carriers.

It should be noted that whether the clipping factor is properly used affects an EVM indicator and a PAPR indicator of a signal, and finally affects security of a power amplifier.

6. Radio Unit and Baseband Unit

One baseband unit may support a plurality of radio units. A multi-channel solution including a baseband unit and a radio unit can better resolve a problem of indoor coverage for large stadiums.

An optical fiber may be used for transmission between the baseband unit and the radio unit, and the radio unit is connected to an antenna through a coaxial cable, a power splitter (coupler), and the like. That is, a backbone uses the optical fiber, and a branch uses the coaxial cable.

The baseband unit (baseband unit, BBU) is mainly configured to complete a baseband processing function (including but not limited to coding, multiplexing, modulation, or spreading) of a Uu interface, an Iub interface function and functions of signaling processing and local and remote operation and maintenance of a radio network controller (radio network controller, RNC), and functions of monitoring a working status of a base station system and reporting alarm information.

The radio unit (radio unit, RU) is mainly configured to convert a digital carrier signal into a radio frequency signal and transmits the radio frequency signal through the antenna. For example, the radio unit includes but is not limited to an intermediate frequency module, a transceiver module, a power amplifier module, or a filter module. The intermediate frequency module is for modulation and demodulation of optical transmission, digital up-conversion and down-conversion, analog-to-digital conversion, and the like. The transceiver module converts an intermediate frequency signal into a radio frequency signal, and then transmits the radio frequency signal through an antenna port by using the power amplifier module and the filter module. The radio unit may be a remote radio unit (remote radio unit, RRU) or an active antenna unit (active antenna unit, AAU).

In embodiments of this application, the radio unit may or may not be remotely deployed.

In an implementation method, when the radio unit is not remotely deployed, the radio unit and the baseband unit may be integrated into a same physical entity, for example, a base station.

With development of integration of a radio frequency module in a communication system, a single radio frequency module is configured to simultaneously process a plurality of carrier signals with different center frequencies. Further, new features introduced by a multi-carrier signal bring more challenges to the clipping processing technology.

Different carrier signals may correspond to different scheduling information. For example, the scheduling information may include powers or bandwidths. Therefore, different scheduling information of carriers may affect clipping performance. For example, because different carrier signals correspond to different signal transmit powers, the signal transmit powers may not match clipping noise powers introduced by clipping of a radio frequency module. For another example, different carriers correspond to different total bandwidths of signals, and signal PAPRs corresponding to the carriers may be different. Embodiments of this application describe a method for performing clipping optimization based on a multi-dimensional feature of a multi-carrier signal, to resolve a problem of communication performance deterioration caused by clipping on the multi-carrier signal.

In the foregoing descriptions, because different carriers may correspond to different scheduling information, clipping optimization usually needs to be performed based on a multi-dimensional feature of a multi-carrier signal. For example, a clipping factor is determined based on one or more of a power, a modulation order, or a bandwidth corresponding to the multi-carrier signal. Embodiments of this application describe a method for determining, based on a parameter in scheduling information, a clipping factor corresponding to a multi-carrier signal. The method includes the following steps.

Step A: Determine, based on scheduling information corresponding to a multi-carrier signal (at least two carrier signals), clipping factors respectively corresponding to the at least two carrier signals, where the scheduling information includes one or more of a power, a bandwidth, or the like.

To be specific, when the clipping factors corresponding to the carrier signals are determined, that is, when proportions of clipping noise borne by the carrier signals are determined, impact of a difference in the scheduling information corresponding to the carrier signals on clipping performance is considered. For example, the impact of the difference on the clipping performance may be that a difference between transmit powers of signals corresponding to different carrier signals causes mismatch between powers of clipping noise introduced by clipping and signal transmit powers of respective carriers, resulting in different EVMs. Alternatively, a difference between bandwidths of signals corresponding to different carrier signals may cause deterioration of signal demodulation performance.

It may be understood that there is an association relationship between the clipping factors corresponding to the carrier signals and one or more parameters in the scheduling information corresponding to the carrier signals, and the association relationship may be a function or a table.

In a possible implementation, the scheduling information includes one or more of a power, a modulation order, a bandwidth, or the like.

Step B: Apply the clipping factors respectively corresponding to the at least two carrier signals to the at least two carrier signals.

In a possible implementation, the clipping factors are applied to the multi-carrier signal. It is easy to understand that, this implementation may be implemented by a unit or module (for example, a first module) having a clipping processing function. In a possible implementation, the first module performs step B after performing step A, that is, determining the clipping factors and applying the clipping factors to the carrier signals may be performed by the first module. The applying the clipping factors to the multi-carrier signal may be understood as that step A and step B are implemented in one module or unit. Optionally, the first module is a remote radio unit or a baseband unit.

In another possible implementation, the clipping factors are transmitted to a unit or module (for example, a second module) having a clipping processing function. For example, the second module is a radio unit. Then, the radio unit applies the clipping factors to the multi-carrier signal.

In a possible implementation, first clipping factors are applied to the at least two carrier signals; and second clipping factors are transmitted to a unit or module having a clipping processing function, and then the unit or module having the clipping processing function performs clipping processing on the at least two carrier signals based on the second clipping factors. For example, the first clipping factors are determined based on the second clipping factors and the scheduling information corresponding to the carrier signals. It may be understood that when the first clipping factors are for performing separate clipping on single carrier signals, the first clipping factors may also be determined by considering the second clipping factors of the combined multi-carrier signal on a radio frequency side, to further implement joint optimization of multi-carrier and multi-level clipping. For an example implementation, refer to related descriptions in step 401.

Optionally, when a clipping factor needs to be transmitted to a unit or module that has a clipping processing function, that is, when information needs to be exchanged between two network elements or modules through an interface, transmission reliability verification on the interface may be further performed, to reduce impact of transmission reliability of the interface on clipping performance. For an example implementation, refer to related descriptions in FIG. 3.

According to the method, when clipping factors corresponding to a plurality of carrier signals are determined, scheduling information corresponding to the plurality of carrier signals is considered to optimize clipping performance. For example, the clipping factors are determined based on powers and/or bandwidths in the scheduling information, to reduce impact on clipping performance caused by different powers and/or bandwidths of different carrier signals, and resolve a problem of communication performance deterioration caused by clipping on a multi-carrier signal. For the foregoing step A and step B, the following describes several specific implementation methods.

In a first implementation method, a baseband unit determines, based on scheduling information respectively corresponding to the at least two carrier signals in a first time unit, clipping factors respectively corresponding to the at least two carrier signals in the first time unit, and then the baseband unit performs clipping processing on a combined signal of the at least two carrier signals based on the clipping factors respectively corresponding to the at least two carrier signals in the first time unit. That is, the baseband unit determines the clipping factors, and the baseband unit performs clipping processing based on the determined clipping factors.

In a second implementation method, a radio unit determines, based on scheduling information respectively corresponding to the at least two carrier signals in a first time unit, clipping factors respectively corresponding to the at least two carrier signals in the first time unit, and then the radio unit performs clipping processing on a combined signal of the at least two carrier signals based on the clipping factors respectively corresponding to the at least two carrier signals in the first time unit. That is, the radio unit determines the clipping factors, and the radio unit performs clipping processing based on the determined clipping factors.

In a third implementation method, a baseband unit determines, based on scheduling information respectively corresponding to the at least two carrier signals in a first time unit, clipping factors respectively corresponding to the at least two carrier signals in the first time unit, then the baseband unit sends the clipping factors respectively corresponding to the at least two carrier signals in the first time unit to a radio unit, and the radio unit performs clipping processing on a combined signal of the at least two carrier signals based on the clipping factors respectively corresponding to the at least two carrier signals in the first time unit. That is, the baseband unit determines the clipping factors, and then sends the clipping factors to the radio unit, and the radio unit performs clipping processing based on the received clipping factors.

In a fourth implementation method, a baseband unit determines, based on scheduling information respectively corresponding to the at least two carrier signals in a first time unit, first clipping factors respectively corresponding to the at least two carrier signals in the first time unit, and then the baseband unit performs separate clipping processing separately on the at least two carrier signals based on the first clipping factors respectively corresponding to the at least two carrier signals in the first time unit. Then, the baseband unit sends at least two clipping-processed carrier signals to a radio unit, and the radio unit performs clipping processing on a combined signal of the at least two carrier signals based on second clipping factors respectively corresponding to the at least two carrier signals in a second time unit. The second time unit includes one or more first time units. To be specific, the baseband unit performs level-1 clipping processing, and the radio unit performs level-2 clipping processing. The second clipping factors that are respectively corresponding to the at least two carrier signals in the second time unit may be determined by the baseband unit, or may be determined by the radio unit. Optionally, when determining the first clipping factors respectively corresponding to the at least two carrier signals in the first time unit, the baseband unit further refers to the second clipping factors respectively corresponding to the at least two carrier signals in the second time unit.

Certainly, embodiments of this application are not limited to the foregoing four specific implementation methods. During actual application, there may be another implementation method. For example, the radio unit performs separate clipping processing (that is, level-1 clipping) separately on a plurality of carrier signals based on first clipping factors respectively corresponding to the plurality of carrier signals in the first time unit, and then performs clipping processing (that is, level-2 clipping) on a combined signal of a plurality of clipping-processed carrier signals.

FIG. 1 shows an architecture to which an embodiment of this application is applicable. The architecture includes a baseband unit and a radio unit.

The baseband unit may send a plurality of carrier signals to the radio unit through an intermediate interface (for example, a common public radio interface (common public radio interface, CPRI) or an enhanced common public radio interface (enhanced common public radio interface, e-CPRI)) for combined clipping. Alternatively, the baseband unit first performs separate clipping separately on a plurality of carrier signals, and then sends a plurality of clipped carrier signals to the radio unit through a CPRI, an e-CPRI, or the like for combined clipping. It is easy to understand that, that the baseband unit performs separate clipping separately on a plurality of carrier signals may also be understood as that each baseband subunit performs separate clipping on a signal corresponding to a single carrier.

Certainly, during actual application, the baseband unit and the radio unit may not be separated from each other, but are integrated into a same physical device.

It should be noted that, in embodiments of this application, an example in which the radio unit and the baseband unit implement a carrier signal processing method in embodiments of this application is used for description. With evolution of communication technologies, another device that subsequently has functions of the radio unit and the baseband unit in embodiments of this application may also implement the carrier signal processing method in embodiments of this application. This is not limited in embodiments of this application.

The following describes a carrier signal processing process by using the third implementation method and the fourth implementation method as examples.

Figure 2:
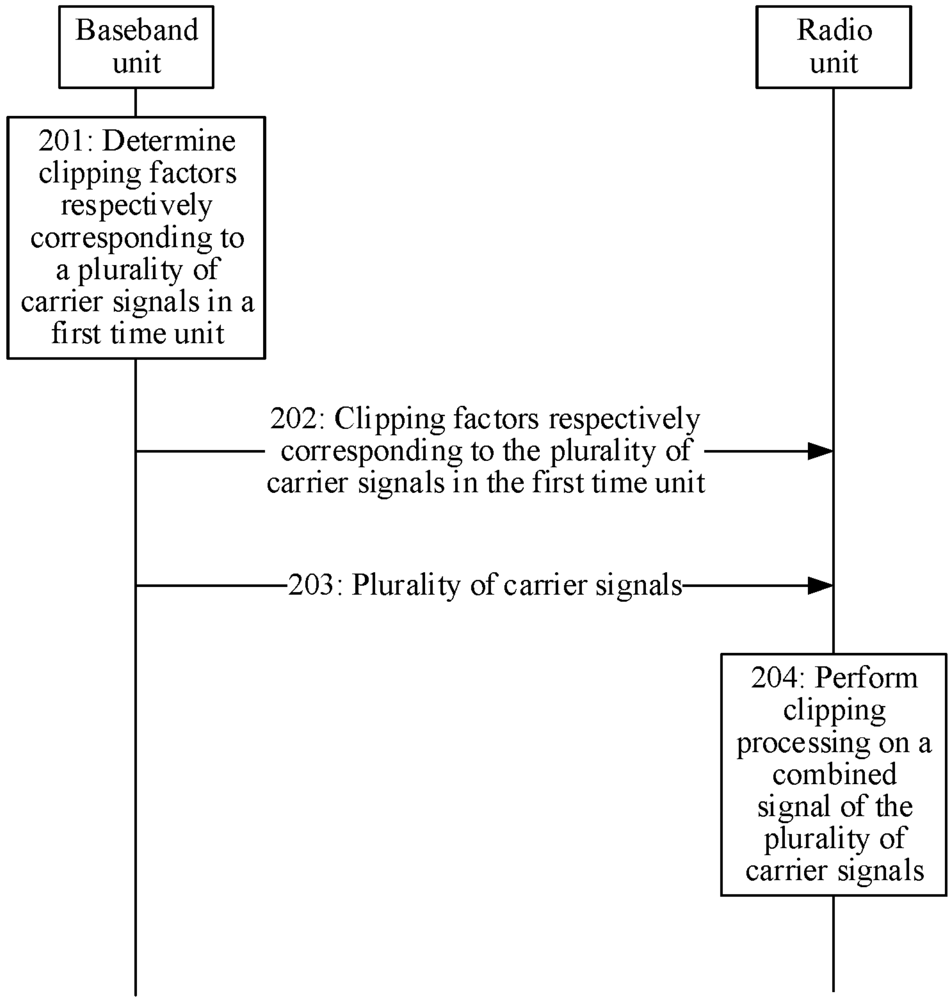
FIG. 2 is a schematic diagram of a carrier signal processing method according to an embodiment of this application.

FIG. 2 is a schematic diagram of a carrier signal processing method according to an embodiment of this application.

The method is an implementation process of carrier processing corresponding to the foregoing third implementation method. According to the method, a baseband unit generates different carrier signals based on scheduling of a time unit, the baseband unit determines, based on a multi-dimensional feature of scheduling information, clipping factors respectively corresponding to a plurality of carrier signals in the time unit, and transmits the clipping factors to a radio unit, and the radio unit performs clipping processing on a multi-carrier signal based on the clipping factors.

The method includes the following steps.

Step 201: The baseband unit determines, based on scheduling information respectively corresponding to the plurality of carrier signals in a first time unit, clipping factors respectively corresponding to the plurality of carrier signals in the first time unit.

Each carrier signal corresponds to one piece of scheduling information in the first time unit. The scheduling information includes one or more of a power, a modulation order, and a bandwidth. It is easy to understand that the scheduling information may also be other information for scheduling or modulating a carrier signal. For example, the clipping factors are determined based on powers and/or bandwidths in the scheduling information. This reduces impact on clipping performance caused by different powers and/or bandwidths of different carrier signals.

To be specific, the clipping factors are related to the scheduling information. For example, an association relationship between the clipping factors and a parameter in the scheduling information is a function, a table, or the like. Based on the foregoing solution, according to the function or the table, a clipping factor corresponding to a carrier signal may be determined based on a parameter in scheduling information corresponding to the carrier signal. The function herein may be a function in any form, for example, a hash function or a ratio function. The table herein may be a table in any form, for example, a database table.

For example, the association relationship between the clipping factors and the parameter in the scheduling information is a function. For example, the function is a ratio function. To be specific, a clipping factor corresponding to a carrier signal in the first time unit is determined based on a ratio of one or more parameters (such as a power, a modulation order, and a bandwidth) in scheduling information corresponding to the carrier signal in the first time unit to one or more parameters in scheduling information corresponding to a preconfigured or predefined reference carrier signal in the first time unit. For another example, the function is a hash function. To be specific, one or more parameters in scheduling information corresponding to a carrier signal in the first time unit are substituted into a preconfigured or predefined hash function, to obtain a clipping factor corresponding to the carrier signal in the first time unit.

For example, the association relationship between the clipping factors and the parameter in the scheduling information is a table. The following Table 1 to Table 3 are different examples.

TABLE 1

| Power corresponding to a carrier signal | Clipping factor corresponding to the carrier signal |
|---|---|
| P1 | F1 |
| P2 | F2 |
| P3 | F3 |
| . . . | . . . |

TABLE 2

| EVM threshold of a modulation order corresponding to a carrier signal | Clipping factor corresponding to the carrier signal |
|---|---|
| EVM1 | F1 |
| EVM2 | F2 |
| EVM3 | F3 |
| . . . | . . . |

TABLE 3

| EVM threshold and power of a modulation order corresponding to a carrier signal | Clipping factor corresponding to the carrier signal |
|---|---|
| EVM1, P1 | F1 |
| EVM1, P2 | F2 |
| EVM1, P3 | F3 |
| EVM2, P1 | F4 |
| EVM2, P2 | F5 |
| EVM2, P3 | F6 |
| . . . | . . . |

The following describes a method for determining the clipping factor by using a specific example. It should be noted that the example does not constitute a limitation on the method for determining the clipping factor. This example is described by using a ratio function as an example.

In an implementation method, it is assumed that there are n carrier signals, and i represents an $i^{th}$ carrier signal, where i=1, 2, . . . , n. $F_i$ represents a clipping factor corresponding to the $i^{th}$ carrier signal in the first time unit, $F_i$ represents a power of the $i^{th}$ carrier signal in the first time unit, $F_j$ represents a power of a $j^{th}$ carrier signal in the first time unit, $EVM_i$ represents an EVM threshold corresponding to a modulation order of the $i^{th}$ carrier signal in the first time unit, $EVM_j$ represents an error vector magnitude EVM threshold corresponding to a modulation order of the $j^{th}$ carrier signal in the first time unit, $BW_i$ represents a bandwidth of the $i^{th}$ carrier signal in the first time unit, and $k_{BW_i}$ represents a clipping correction factor corresponding to the $i^{th}$ carrier signal in the first time unit.

$$k_{BW_i}$$

is related to $BW_i$. Generally, a larger value of $BW_i$ indicates a smaller value of $$k_{BW_i}.$$

$BW_i$ represents a bandwidth of the $j^{th}$ carrier signal in the first time unit, and $$k_{BW_i}$$

represents a clipping correction factor corresponding to the $j^{th}$ carrier signal in the first time unit. A clipping correction factor is related to a bandwidth of a carrier signal.

The $j^{th}$ carrier signal is the reference carrier signal. For example, the first carrier signal may be pre-agreed, pre-configured, or dynamically configured as the reference carrier signal, that is, a value of j herein is 1; or a carrier signal with a greatest power is pre-agreed or pre-configured as the reference carrier signal, that is, a value of j herein is a sequence number of a carrier signal whose power is the greatest. In other words, there are a plurality of implementations of selecting the reference carrier signal. The reference carrier signal may be one of the plurality of carrier signals, or may be a predefined carrier signal. This is not limited in this embodiment of this application. It is easy to understand that, when the reference carrier signal is dynamically configured, the reference carrier signal may further be dynamically exchanged between different network elements. For example, an index or an identifier of the carrier signal, or another manner that can identify the reference carrier signal is dynamically exchanged. The reference carrier signal in this embodiment of this application may also be referred to as a basic carrier signal.

For example, $$F_i = f\{(P_i)\} = P_j/P_i, \text{ where } i = 1, 2, \ldots, n. \quad \text{(formula 1-1)}$$

For example, $$F_i = f\{P_i, EVM_i)\} = \left(P_j * EVM_j^2\right)/\left(P_i * EVM_i^2\right), \text{ where } i = 1, 2, \ldots, n. \quad \text{(formula 1-2)}$$

For example, $$F_i = f\{(P_i, EVM_i, k_{BW_i})\} = \left(P_j * EVM_j^2 * k_{BW_j}\right)/\left(P_i * EVM_i^2 * k_{BW_i}\right), \text{ where } i = 1, 2, \ldots, n. \quad \text{(formula 1-3)}$$

For example, $$F_i = f\{(EVM_i, k_{BW_i})\} = \left(EVM_j^2 * k_{BW_j}\right)/\left(EVM_i^2 * k_{BW_i}\right), \text{ where } i = 1, 2, \ldots, n. \quad \text{(formula 1-4)}$$

For example, $$F_i = f\{(EVM_i)\} = EVM_j^2/EVM_i^2, \text{ where } i = 1, 2, \ldots, n. \quad \text{(formula 1-5)}$$

For example, $$F_i = f\{(k_{BW_i})\} = k_{BW_j}/k_{BW_i}, \text{ where } i = 1, 2, \ldots, n. \quad \text{(formula 1-6)}$$

For example, $$F_i = f\{(P_i, k_{BW_i})\} = \left(P_j{}^* k_{BW_j}\right)/\left(P_i{}^* k_{BW_i}\right), \text{ where } i = 1, 2, \ldots, n. \quad \text{(formula 1-7)}$$

Specially, $F_j=1$.

It should be noted that the foregoing formulas are merely used as examples, and do not constitute a limitation on determining the clipping factor corresponding to the $i^{th}$ carrier signal in the first time unit in this embodiment of this application.

For example, squares in $$EVM_j^2 \text{ and } EVM_i^2$$

in the foregoing formulas (1-2), (1-3), (1-4), and (1-5) may also be changed to a power of 3 or a power of 4.

Step 202: The baseband unit sends clipping factors respectively corresponding to the plurality of carrier signals in the first time unit to the radio unit. Correspondingly, the radio unit receives the clipping factors respectively corresponding to the plurality of carrier signals in the first time unit.

For example, the baseband unit sends the clipping factors respectively corresponding to the plurality of carrier signals in the first time unit to the radio unit through an intermediate interface (for example, a CPRI or an e-CPRI) between the baseband unit and the radio unit, so that the radio unit can receive the clipping factors respectively corresponding to the plurality of carrier signals in the first time unit.

In an implementation method, if the clipping factors respectively corresponding to the plurality of carrier signals in the first time unit are calculated according to any one of the foregoing formulas (1-1) to (1-6), when the $j^{th}$ carrier signal is selected as the reference carrier signal, because the clipping factor corresponding to the $j^{th}$ carrier signal is 1, the baseband unit and the radio unit may pre-agree that the clipping factor corresponding to the $j^{th}$ carrier signal is 1. Therefore, the baseband unit may send, to the radio unit, the other n−1 clipping factors except the clipping factor corresponding to the $j^{th}$ carrier signal, but does not send the pre-agreed clipping factor corresponding to the $j^{th}$ carrier signal.

In an implementation method, a formula for determining a clipping factor of a carrier signal may be flexibly selected based on different performance requirements. For example, a trigger condition may be preconfigured. When performance meets a threshold, the clipping factor is calculated according to a pre-selected formula.

Step 203: The baseband unit sends the plurality of carrier signals to the radio unit. Correspondingly, the radio unit receives the plurality of carrier signals.

Step 202 and step 203 are not subject to a time sequence. For example, the clipping factors and the carrier signals may be sent together, or may be sent in different messages, but a sending sequence is not limited.

Step 204: The radio unit performs clipping processing on a combined signal of the plurality of carrier signals based on the clipping factors respectively corresponding to the plurality of carrier signals in the first time unit.

To be specific, the radio unit performs, based on the clipping factors, clipping processing on a combined signal of a multi-carrier signal corresponding to the first time unit. A method for the radio unit to perform clipping processing on the combined signal of the at least two carrier signals may be, for example, amplitude limiting clipping or Keneral (Keneral) clipping.

For example, there are three carrier signals in total: a carrier signal 1, a carrier signal 2, and a carrier signal 3. Clipping factors respectively corresponding to the three carrier signals are a clipping factor 1, a clipping factor 2, and a clipping factor 3. The radio unit applies the clipping factor 1 to the carrier signal 1 in a combined signal of the three carrier signals, applies the clipping factor 2 to the carrier signal 2 in the combined signal of the three carrier signals, and applies the clipping factor 3 to the carrier signal 3 in the combined signal of the three carrier signals, to implement clipping processing and obtain a clipped combined signal.

For example, the combined signal may be understood as a representation of a signal in time domain. The combined signal may be separated into signals of a plurality of carriers through frequency domain transformation, where the plurality of carriers may be understood as having different center frequencies.

Based on this solution, clipping factors respectively corresponding to a plurality of carrier signals in the first time unit are determined at a time unit granularity, and the clipping factors respectively corresponding to the plurality of carrier signals in the first time unit are sent to the radio unit. In this way, the radio unit can complete clipping at the time unit granularity, to ensure clipping performance, thereby resolving a problem of communication performance deterioration caused by clipping of the plurality of carrier signals. In addition, when the baseband unit exchanges information with the radio unit through an interface, the baseband unit sends the clipping factors respectively corresponding to the plurality of carrier signals in the first time unit to the radio unit, so that load of the transmission interface can be reduced.

It is easy to understand that information transfer between the baseband unit and the radio unit may be implemented through a transmission interface, and this type of transmission interface may be an optical fiber. However, optical fiber transmission also has a specific error probability, and transmission through the interface with the error probability affects reliability of the information transfer between the baseband unit and the radio unit.

For example, after step 203, the radio unit may further determine transmission reliability of the clipping factors. When determining that transmission reliability of the clipping factors is reliable, the radio unit performs step 204.

For example, when it is determined that transmission of the clipping factors is unreliable, clipping processing performed on the combined signals of the at least two carrier signals in the time unit is canceled, and sending of the combined signal of the at least two carrier signals corresponding to the time unit is canceled. It is easy to understand that the foregoing interface reliability determining is an optional step. In addition, the determining is not limited to performing reliability verification on the clipping factors, but further includes performing reliability verification on information, for example, the clipping factors and the scheduling information, transmitted through the interface.

Optionally, a method for determining transmission reliability of the clipping factors by the radio unit may be, for example, a cyclic redundancy check (cyclic redundancy check, CRC) method. Determining reliability of transmitting the clipping factors through the interface can ensure clipping reliability and ensure security of a power amplifier unit, thereby resolving a problem of communication performance deterioration caused by clipping of the plurality of carrier signals. For example, in a scenario in which transmission needs to be performed between the baseband unit and the radio unit through an intermediate interface, a bit error may exist in transmission through the intermediate interface between the baseband unit and the radio unit. Therefore, the problem of communication performance deterioration caused by clipping of the plurality of carrier signals can be further resolved. Optionally, when the radio unit determines that transmission of the clipping factors is unreliable, the baseband unit may cancel sending of the combined signal of the plurality of carrier signals. When sending of the combined signal of the plurality of carrier signals is canceled, an operation of performing clipping processing on the combined signal of the plurality of carrier signals may not be performed, so that overheads can be reduced.

Figure 3:
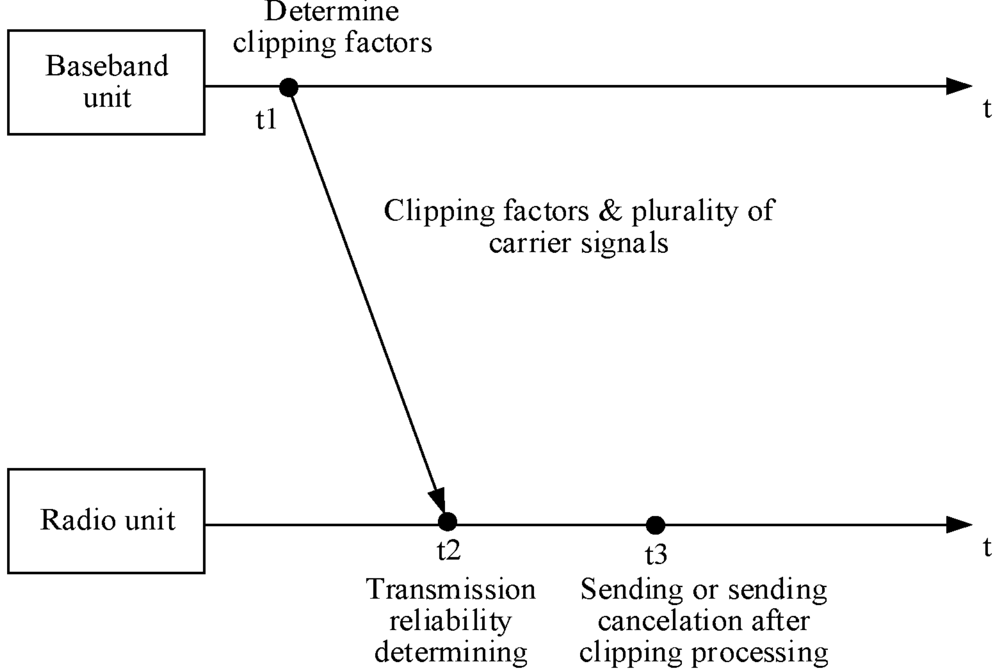
FIG. 3 is a schematic diagram of a time sequence operation according to an embodiment of this application.

FIG. 3 is a schematic diagram of a corresponding time sequence operation. At a moment t1, the baseband unit determines clipping factors respectively corresponding to the plurality of carrier signals in the first time unit, and sends the clipping factors respectively corresponding to the plurality of carrier signals in the first time unit to the radio unit. At a moment t2, the radio unit receives the clipping factors respectively corresponding to the plurality of carrier signals in the first time unit, and determines transmission reliability of the clipping factors. At a moment t3, the radio unit performs, based on a result of determining the transmission reliability, clipping processing on the combined signal of the plurality of carrier signals, and then sends the combined signal, or cancels sending of the combined signal of the plurality of carrier signals.

Figures 4, 5:
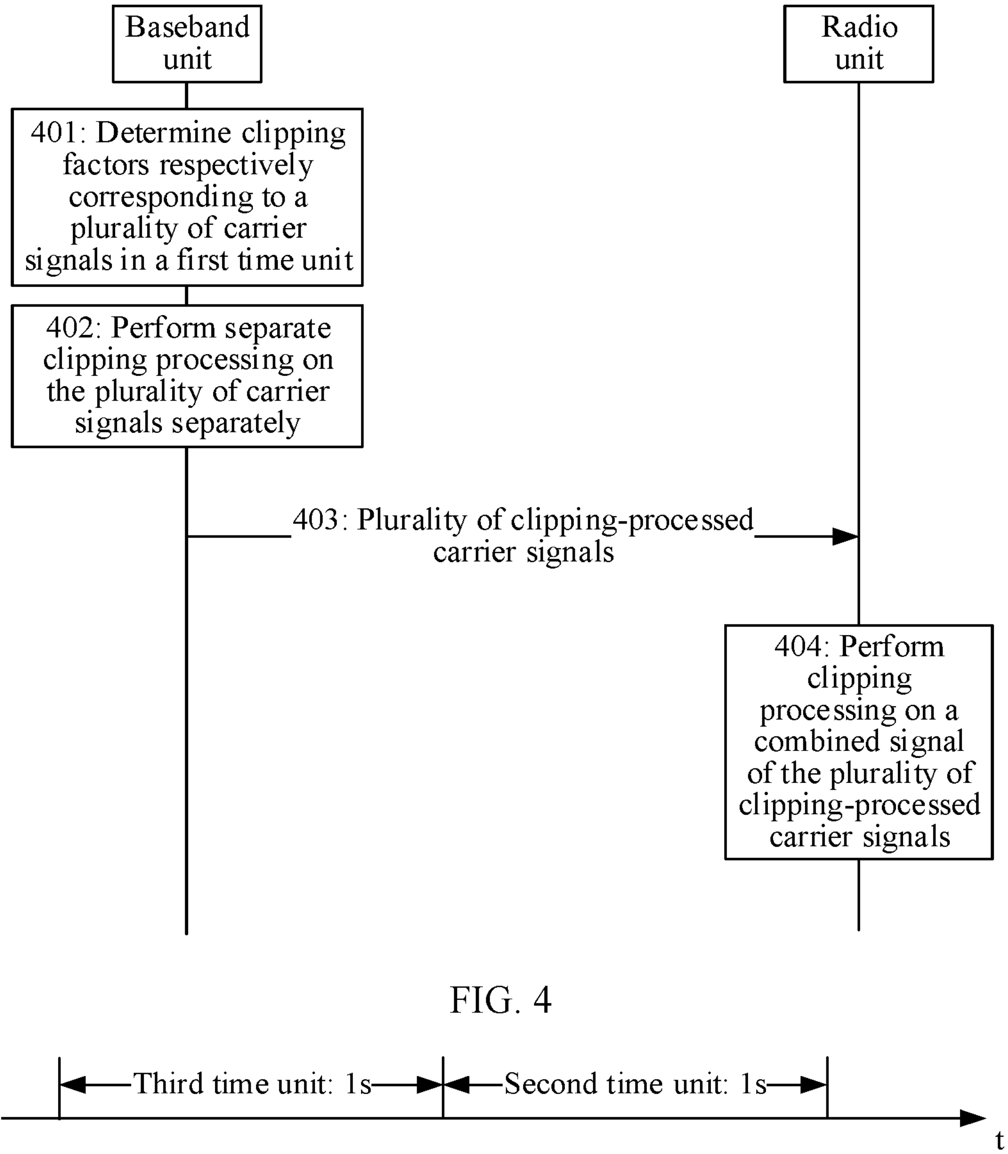
FIG. 4 is a schematic diagram of another carrier signal processing method according to an embodiment of this application.
FIG. 5 is a schematic diagram of a relationship between a second time unit and a third time unit.

FIG. 4 is a schematic diagram of a carrier signal processing method according to an embodiment of this application. The method is an implementation process of carrier processing corresponding to the foregoing fourth implementation method. In the method, a baseband unit generates different carrier signals based on scheduling of a time unit, and the baseband unit determines, based on a multi-dimensional feature of scheduling information, first clipping factors respectively corresponding to a plurality of carrier signals in a first time unit, performs separate clipping (also referred to as level-1 clipping) separately on the plurality of carrier signals based on the first clipping factors respectively corresponding to the plurality of carrier signals in the first time unit, and then sends a plurality of clipping-processed carrier signals to a radio unit. The radio unit further performs clipping (also referred to as level-2 clipping) on a combined signal of the plurality of carrier signals based on second clipping factors respectively corresponding to the plurality of carrier signals in a second time unit.

The method includes the following steps.

Step 401: The baseband unit determines, based on scheduling information respectively corresponding to the plurality of carrier signals in the first time unit, the first clipping factors respectively corresponding to the plurality of carrier signals in the first time unit.

The scheduling information respectively corresponding to the plurality of carrier signals in the first time unit may be understood as a scheduling information set of a multi-carrier signal in the first time unit.

To be specific, the first clipping factors are related to the scheduling information. For example, an association relationship between the first clipping factors and a parameter in the scheduling information is a function, a table, or the like. Based on the foregoing solution, according to the function or the table, a first clipping factor corresponding to a carrier signal may be determined based on a parameter in scheduling information corresponding to the carrier signal. The function herein may be a function in any form, for example, a hash function or a ratio function. The table herein may be a table in any form, for example, a database table.

For example, the association relationship between the first clipping factors and the parameter in the scheduling information is a function. For example, the function is a ratio function. To be specific, a first clipping factor corresponding to a carrier signal in the first time unit is determined based on a ratio of one or more parameters (such as a power, a modulation order, and a bandwidth) in scheduling information corresponding to the carrier signal in the first time unit to one or more parameters in scheduling information corresponding to a preconfigured or predefined reference carrier signal in the first time unit. For another example, the function is a hash function. To be specific, one or more parameters in scheduling information corresponding to a carrier signal in the first time unit are substituted into a preconfigured or predefined hash function, to obtain a first clipping factor corresponding to the carrier signal in the first time unit.

In a possible implementation method, the baseband unit may determine, by using the method in the embodiment corresponding to FIG. 2, the first clipping factors respectively corresponding to the plurality of carrier signals in the first time unit. For a specific implementation process, refer to the foregoing descriptions. Details are not described herein again.

In a possible implementation, the baseband unit may determine the first clipping factors based on the second clipping factors. For example, the baseband unit receives the second clipping factors sent by the radio unit, where the second clipping factors are for clipping the carrier signals in the second time unit. A clipping factor exchange manner is used. When clipping factors are determined, coupling of a plurality of levels of clipping factors is considered, so that clipping pre-processing (for example, single-carrier clipping) and clipping of the combined signal of the plurality of carrier signals are coupled, thereby improving clipping performance.

In a possible implementation method, the baseband unit may alternatively determine, based on the scheduling information respectively corresponding to the plurality of carrier signals in the first time unit and the second clipping factors respectively corresponding to the plurality of carrier signals in the second time unit, the first clipping factors respectively corresponding to the plurality of carrier signals in the first time unit. The second time unit includes one or more first time units.

The following describes a method for determining the first clipping factor by using a specific example. It should be noted that the example does not constitute a limitation on the method for determining the first clipping factor. This example is described by using a ratio function as an example.

In an implementation method, it is assumed that there are n carrier signals, and i represents an $i^{th}$ carrier signal in the n carrier signals, where i=1, 2, . . . , n. The second time unit is divided into m first time units, and j represents a $j^{th}$ time unit in the m first time units, where j=1, 2, . . . , m. It should be noted that a plurality of first time units included in the second time unit may be the same, or may be different.

$$F_{i,j}^{1}$$

represents a first clipping factor corresponding to the $i^{th}$ carrier signal in the $j^{th}$ first time unit in the second time unit, $$F_{i}^{2}$$

represents a second clipping factor corresponding to the $i^{th}$ carrier signal in the second time unit, $$P_{i,j}^{1}$$

represents a power of the $i^{th}$ carrier signal in the $j^{th}$ first time unit in the second time unit, $$P_{k,j}^{1}$$

represents a power of a $k^{th}$ carrier signal in the $j^{th}$ first time unit in the second time unit, $$EVM_{i,j}^{1}$$

represents an EVM threshold corresponding to a modulation order of the $i^{th}$ carrier signal in the $j^{th}$ first time unit in the second time unit, and $$EVM_{k,j}^{1}$$

represents an EVM threshold corresponding to a modulation order of the $k^{th}$ carrier signal in the $j^{th}$ first time unit in the second time unit. It should be noted that, $$F_{i}^{2}$$

has reflected a bandwidth factor. This is because due to a slow variation characteristic of a bandwidth, it is assumed that bandwidths corresponding to different carrier signals in the second time unit are the same.

The $k^{th}$ carrier signal is the reference carrier signal. For example, the first carrier signal may be pre-agreed or pre-configured as the reference carrier signal, that is, a value of k herein is 1; or a carrier signal with a greatest power is pre-agreed or pre-configured as the reference carrier signal, that is, a value of k herein is a sequence number of a carrier signal whose power is the greatest.

For example, $$F_{i,j}^1 = f\{(P_{i,j}^1, EVM_{i,j}^1, F_i^2)\} = (P_{k,j}^1 * (EVM_{k,j}^1)^2)/(P_{i,j}^1 * (EVM_{i,j}^1)^2)/F_i^2, \quad \text{(formula 3-1)}$$

where $i = 1, 2, \ldots, n$, and $j = 1, 2, \ldots, m$.

For example, $$F_{i,j}^1 = f\{(P_{i,j}^1 F_i^2)\} = P_{k,j}^1/P_{i,j}^1/F_i^2, \quad \text{(formula 3-2)}$$

where $i = 1, 2, \ldots, n$, and $j = 1, 2, \ldots, m$.

For example, $$F_{ij}^1 = f\{(EVM_{i,j}^1, F_i^2)\} = EVM_{k,j}^1)^2/(EVM_{i,j}^1)^2/F_i^2, \quad \text{(formula 3-3)}$$

where $i = 1, 2, \ldots, n$.

Specially, $$F_{k,j}^1 = 1/F_k^2.$$

Formula 3-1 is used as an example below. Formula 3-1 is further described with reference to a specific example. In addition, in the following example, the first carrier signal is used as the reference carrier signal, that is, a value of k in formula 3-1 is 1.

It is assumed that there are four carrier signals, the second time unit is 1 s, and the first time unit is 1 ms. In this case, the second time unit includes 1000 first time units.

In the $1^{st}$ ms:

a clipping factor corresponding to a carrier signal 1 is $$F_{1,1}^1 = 1/F_1^2;$$

a clipping factor corresponding to a carrier signal 2 is $$F_{2,1}^1 = (P_{1,1}^1 * (EVM_{1,1}^1)^2)/(P_{2,1}^1 * (EVM_{2,1}^1)^2)/F_2^2;$$

a clipping factor corresponding to a carrier signal 3 is $$F_{3,1}^1 = (P_{1,1}^1 * (EVM_{1,1}^1)^2)/(P_{3,1}^1 * (EVM_{3,1}^1)^2)/F_3^2;$$

a clipping factor corresponding to a carrier signal 4 is $$F_{4,1}^1 = (P_{1,1}^1 * (EVM_{1,1}^1)^2)/(P_{4,1}^1 * (EVM_{4,1}^1)^2)/F_4^2.$$

In the $2^{nd}$ ms:

a clipping factor corresponding to a carrier signal 1 is $$F_{1,2}^1 = 1/F_1^2;$$

a clipping factor corresponding to a carrier signal 2 is $$F_{2,2}^1 = (P_{1,2}^1 * (EVM_{1,2}^1)^2)/(P_{2,2}^1 * (EVM_{2,2}^1)^2)/F_2^2;$$

a clipping factor corresponding to a carrier signal 3 is $$F_{3,2}^1 = (P_{1,2}^1 * (EVM_{1,2}^1)^2)/(P_{3,2}^1 * (EVM_{3,2}^1)^2)/F_3^2;$$

and a clipping factor corresponding to a carrier signal 4 is $$F_{4,2}^1 = (P_{1,2}^1 * (EVM_{1,2}^1)^2)/(P_{4,2}^1 * (EVM_{4,2}^1)^2)/F_4^2.$$

In the $t^{th}$ ms:

a clipping factor corresponding to a carrier signal 1 is $$F_{1,t}^1 = 1/F_1^2;$$

a clipping factor corresponding to a carrier signal 2 is $$F_{2,t}^1 = (P_{1,t}^1 * (EVM_{1,t}^1)^2)/(P_{2,t}^1 * (EVM_{2,t}^1)^2)/F_2^2;$$

a clipping factor corresponding to a carrier signal 3 is $$F_{3,t}^1 = (P_{1,t}^1 * (EVM_{1,t}^1)^2)/(P_{3,t}^1 * (EVM_{3,t}^1)^2)/F_3^2;$$

and a clipping factor corresponding to a carrier signal 4 is $$F_{4,t}^1 = (P_{1,t}^1 * (EVM_{1,t}^1)^2)/(P_{4,t}^1 * (EVM_{4,t}^1)^2)/F_4^2.$$

In an implementation method, the second clipping factors respectively corresponding to the plurality of carrier signals in the second time unit may be determined by the radio unit, and sent to the baseband unit before step 401.

The second clipping factors of the radio unit may be determined by the scheduling information set of the multi-carrier signal. For example, the second clipping factors are determined by a statistical value (for example, an average value) or an extreme value (for example, a maximum value) of clipping factors determined based on a plurality of groups of scheduling information sets of the multi-carrier signal.

It is easy to understand that the scheduling information set of the multi-carrier signal may be a scheduling information set in the second time unit, or may be a scheduling information set in a time period before the second time unit. For example, the scheduling information set of the multi-carrier signal may be a scheduling information set of the multi-carrier signal in a third time unit, where the third time unit is earlier than the second time unit in a time sequence.

For example, the radio unit obtains a pre-sent scheduling information set corresponding to the second time unit, where the second time unit includes a plurality of first time units, and the radio unit determines, based on scheduling information corresponding to the plurality of first time units, statistical values or extreme values of clipping factors corresponding to the plurality of first time units as the second clipping factors corresponding to the multi-carrier signal in the second time unit.

For example, the radio unit may determine, based on a plurality of third clipping factors corresponding to each carrier signal in the third time unit, a second clipping factor corresponding to the carrier signal in the second time unit. The third time unit is earlier than the second time unit in a time sequence. For example, the radio unit determines an average value of a plurality of third clipping factors corresponding to each carrier signal in the third time unit as the second clipping factor corresponding to the carrier signal in the second time unit. For another example, the radio unit determines a maximum value of a plurality of third clipping factors corresponding to each carrier signal in the third time unit as the second clipping factor corresponding to the carrier signal in the second time unit.

The following provides descriptions with reference to a specific example. FIG. 5 is a schematic diagram of a relationship between the second time unit and the third time unit. The second time unit is 1 s, and the third time unit is 1 s before the second time unit. The third time unit includes a fourth time unit, and the fourth time unit is 1 ms. In other words, the third time unit includes 1000 fourth time units. Each of the n carrier signals corresponds to 1000 third clipping factors in the third time unit. For example, it is determined that a second clipping factor corresponding to the first carrier signal in the second time unit is equal to an average value of 1000 third clipping factors corresponding to the first carrier signal in the third time unit, and it is determined that a second clipping factor corresponding to the second carrier signal in the second time unit is equal to an average value of 1000 third clipping factors corresponding to the second carrier signal in the third time unit. The rest may be deduced by analogy. For another example, it is determined that a second clipping factor corresponding to the first carrier signal in the second time unit is equal to a maximum value of 1000 third clipping factors corresponding to the first carrier signal in the third time unit, and it is determined that a second clipping factor corresponding to the second carrier signal in the second time unit is equal to a maximum value of 1000 third clipping factors corresponding to the second carrier signal in the third time unit. The rest may be deduced by analogy.

In another implementation method, alternatively, the second clipping factors respectively corresponding to the plurality of carrier signals in the second time unit may be determined by the baseband unit, and sent to the radio unit before step 404. For example, the baseband unit may determine, based on a plurality of third clipping factors corresponding to each carrier signal in the third time unit, a second clipping factor corresponding to the carrier signal in the second time unit. The third time unit is earlier than the second time unit in a time sequence. For example, the baseband unit determines an average value of a plurality of third clipping factors corresponding to each carrier signal in the third time unit as the second clipping factor corresponding to the carrier signal in the second time unit. For another example, the baseband unit determines a maximum value of a plurality of third clipping factors corresponding to each carrier signal in the third time unit as the second clipping factor corresponding to the carrier signal in the second time unit.

Step 402: The baseband unit performs separate clipping processing on the plurality of carrier signals respectively, based on the first clipping factors respectively corresponding to the plurality of carrier signals in the first time unit.

It should be noted that first clipping factors respectively corresponding to different carrier signals in the first time unit may be the same or may be different.

Specifically, the baseband unit performs separate clipping processing on each carrier signal based on a first clipping factor corresponding to the carrier signal in the first time unit. For example, if there are n carrier signals, clipping processing is performed on the first carrier signal based on a first clipping factor corresponding to the first carrier signal, clipping processing is performed on the second carrier signal based on a first clipping factor corresponding to the second carrier signal, and the rest may be deduced by analogy.

For example, baseband signals of all of a plurality of carriers may be generated in different baseband subunits, and performing separate clipping processing on each carrier signal may be understood as performing, by each baseband subunit, separate clipping processing on a signal corresponding to a single carrier.

When each baseband subunit performs separate clipping on a signal corresponding to a single carrier, scheduling information of other carriers in the plurality of carriers may be considered for determining a clipping factor of the signal, to ensure joint optimization of clipping factors to some extent. Further, considering the impact of a radio frequency side on a combined multi-carrier signal, when each baseband subunit performs separate clipping on the signal corresponding to the single carrier, the clipping factor of the signal may also be determined by considering the clipping factor of the combined multi-carrier signal on the radio frequency side, to further implement joint optimization of multi-carrier and multi-level clipping.

It is easy to understand that, that the baseband unit performs separate clipping (level-1 clipping) on a single carrier in the plurality of carrier signals is described in step 401 and step 402, which is applicable to a scenario in which a large delay is caused when clipping is performed on the combined multi-carrier signal on a baseband side.

In a possible implementation, the baseband unit may alternatively perform clipping processing on the combined signal of the plurality of carrier signals. For specific implementations of a method for determining a clipping factor corresponding to the combined signal and a method for applying the clipping factor, refer to the related descriptions in step 201 and step 202. A difference is that the baseband unit applies the clipping factor to perform clipping processing.

Step 403: The baseband unit sends the plurality of clipping-processed carrier signals to the radio unit. Correspondingly, the radio unit receives the plurality of clipping-processed carrier signals.

Step 404: The radio unit performs clipping processing on a combined signal of the plurality of clipping-processed carrier signals based on the second clipping factors respectively corresponding to the plurality of carrier signals in the second time unit.

In other words, the second clipping factors are for performing clipping processing on the combined signal of the plurality of clipping-processed carrier signals in step 402.

For a specific implementation method in which the radio unit performs clipping processing on the combined signal of the plurality of clipped carrier signals, refer to the foregoing descriptions. Details are not described herein again.

In the foregoing solution, the baseband unit first determines the first clipping factors respectively corresponding to the plurality of carrier signals in the first time unit, performs, based on the first clipping factors respectively corresponding to the plurality of carrier signals in the first time unit, separate clipping processing on each carrier signal for a first time, and then sends a carrier signal obtained through the first-time clipping to the radio unit. The radio unit performs, based on a second clipping factor, clipping processing on a combined signal of clipped carrier signals for a second time, to obtain a carrier signal obtained through the second-time clipping. A clipping factor exchange manner is used. When clipping factors are determined, not only scheduling information of the plurality of carrier signals is considered, but also coupling of a plurality of levels of clipping factors is considered, so that clipping pre-processing (for example, single-carrier clipping) and clipping of the combined signal of the plurality of carrier signals are coupled, thereby improving clipping performance. In addition, the multi-level clipping solution may not depend on a reliability assurance requirement of transmission through an intermediate interface between the baseband unit and the radio unit, and therefore, use is more flexible. It is easy to understand that, no limitation is imposed on whether the multi-level clipping solution uses transmission reliability verification on the interface. For example, transmission reliability verification on the interface is performed in the multi-level clipping solution. For a specific implementation, refer to the related descriptions about the transmission reliability verification on the interface in the method 300.

Figure 6:
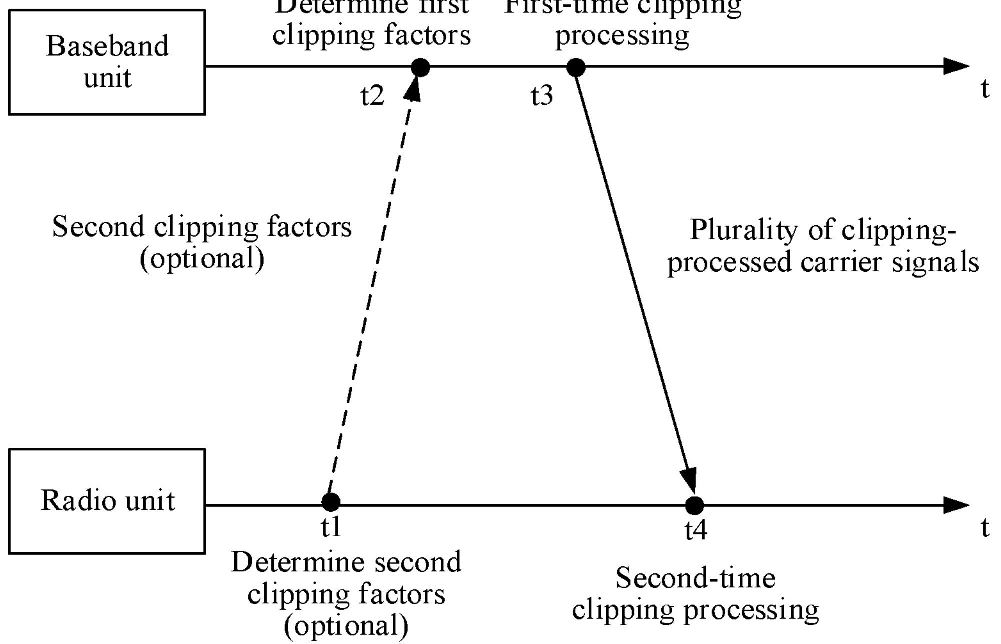
FIG. 6 is a schematic diagram of another time sequence operation according to an embodiment of this application.

FIG. 6 is a schematic diagram of a corresponding time sequence operation. At a moment t1, the radio unit determines second clipping factors respectively corresponding to the plurality of carrier signals in the second time unit, and sends the second clipping factors respectively corresponding to the plurality of carrier signals in the second time unit to the baseband unit. At a moment t2, the baseband unit determines, based on the received second clipping factors respectively corresponding to the plurality of carrier signals in the second time unit and the received scheduling information respectively corresponding to the plurality of carrier signals in the first time unit, the first clipping factors respectively corresponding to the plurality of carrier signals in the first time unit. At a moment t3, the baseband unit performs first-time clipping processing (also referred to as level-1 clipping processing) on each carrier signal based on a first clipping factor corresponding to the carrier signal in the first time unit, and then sends the plurality of clipping-processed carrier signals to the radio unit. At a moment t4, the radio unit receives the plurality of clipping-processed carrier signals, and then performs, based on the second clipping factors respectively corresponding to the plurality of carrier signals in the second time unit, second-time clipping processing (also referred to as level-2 clipping processing) on the combined signal of the plurality of clipping-processed carrier signals.

It should be noted that, in the foregoing example, the radio unit determines the second clipping factors respectively corresponding to the plurality of carrier signals in the second time unit, and sends the second clipping factors respectively corresponding to the plurality of carrier signals in the second time unit to the baseband unit. In another implementation method, alternatively, the baseband unit may determine the second clipping factors respectively corresponding to the plurality of carrier signals in the second time unit, and then send the second clipping factors respectively corresponding to the plurality of carrier signals in the second time unit to the radio unit. Certainly, alternatively, the baseband unit and the radio unit may separately determine the second clipping factors respectively corresponding to the plurality of carrier signals in the second time unit, and the second clipping factors determined by the baseband unit and the radio unit are the same. For example, the baseband unit and the radio unit separately determine the second clipping factors based on a same method for determining a clipping factor, so that the second clipping factors determined by the baseband unit and the radio unit are the same. For example, the method may be: determining, based on the plurality of third clipping factors corresponding to each carrier signal in the third time unit, a second clipping factor corresponding to the carrier signal in the second time unit. The third time unit is earlier than the second time unit in a time sequence. For example, the baseband unit and the radio unit separately determine an average value of a plurality of third clipping factors corresponding to each carrier signal in the third time unit as the second clipping factor corresponding to the carrier signal in the second time unit. For example, the baseband unit and the radio unit separately determine a maximum value of a plurality of third clipping factors corresponding to each carrier signal in the third time unit as the second clipping factor corresponding to the carrier signal in the second time unit.

The foregoing describes in detail the third implementation method and the fourth implementation method described above. Specific implementation processes of the foregoing first implementation method and second implementation method are similar to that of the foregoing third implementation method. A difference lies in that: Clipping factors and/or execution bodies of clipping processing are different. For the foregoing first implementation method, the baseband unit determines clipping factors, and the baseband unit performs clipping processing based on the clipping factors. For the foregoing second implementation method, the radio unit determines clipping factors, and the radio unit performs clipping processing based on the clipping factors. For the foregoing third implementation method, the baseband unit determines clipping factors, and the radio unit performs clipping processing based on the clipping factors.

For example, when a computing capability of the radio unit is limited, clipping processing may be implemented by using the first implementation method or the third implementation method. When the computing capability of the radio unit is sufficient, clipping processing may be implemented by using the second implementation method, or certainly, clipping processing may be implemented by using the first implementation method or the third implementation method.

To further improve a problem of communication performance deterioration caused by clipping of a plurality of carrier signals, the baseband unit may further pre-process the plurality of carrier signals before clipping. It should be noted that, the following embodiment corresponding to FIG. 7 may be implemented separately, or may be implemented in combination with any one of the foregoing carrier signal processing methods (for example, the first implementation method, the second implementation method, the third implementation method, or the fourth implementation method described above, or another implementation method).

Figures 7, 8:
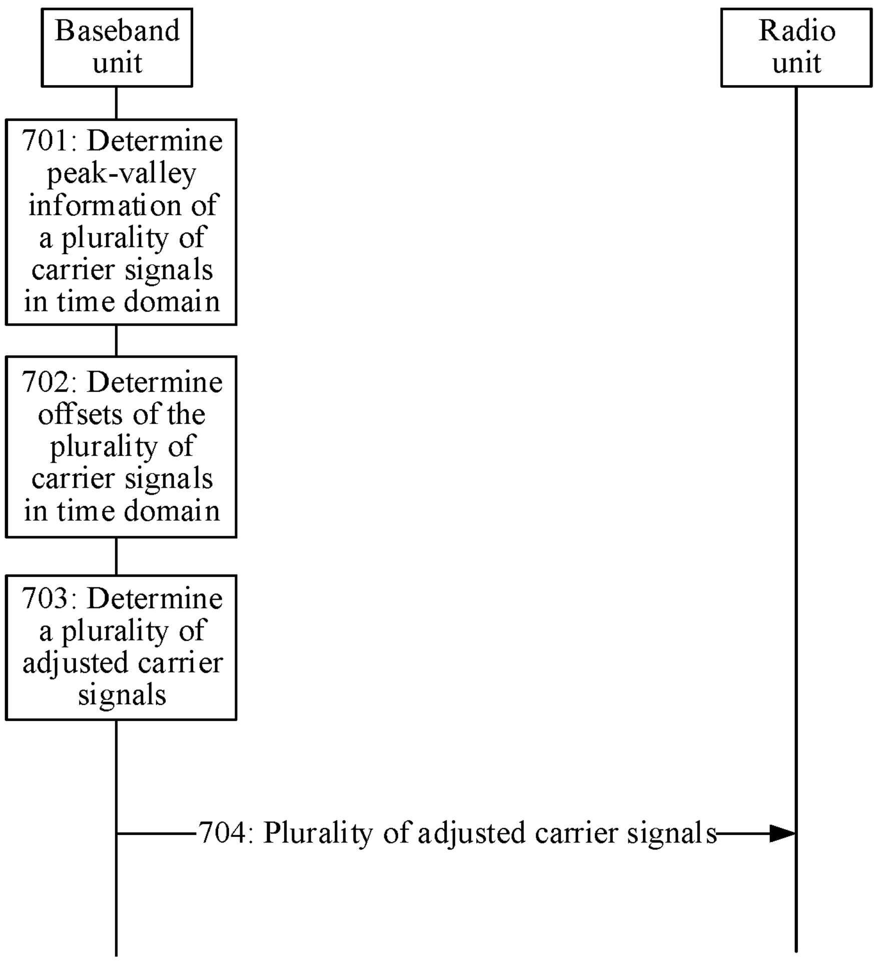
FIG. 7 is a schematic diagram of another carrier signal processing method according to an embodiment of this application.
FIG. 8 is a schematic diagram of a communication apparatus according to an embodiment of this application.

FIG. 7 is a schematic diagram of another carrier signal processing method according to an embodiment of this application. It should be noted that the method in this embodiment may be executed by a baseband unit, or may be jointly executed by a plurality of baseband subunits in the baseband unit.

The method includes the following steps.

Step 701: The baseband unit determines peak-valley information of a plurality of carrier signals in time domain.

Peak-valley information of a carrier signal in time domain indicates peak information and/or valley information of the carrier signal in time domain. In other words, the peak-valley information includes peak information and/or valley information.

For example, for a carrier signal, the baseband unit determines information about a sampling point sequence whose amplitude exceeds a threshold in all sampling information of the carrier signal in time domain, where the information includes a sampling point number and phase information. If a phase of a sampling point in the sampling point sequence is positive, the sampling point is a peak sampling point, and peak information of the carrier signal in time domain may include information about the peak sampling point. If the phase of the sampling point in the sampling point sequence is negative, the sampling point is a valley sampling point, and valley information of the carrier signal in time domain may include information about the valley sampling point.

It is easy to understand that a baseband signal (corresponding to one carrier signal) corresponding to each carrier may be processed by an independent baseband subunit. That the baseband unit determines peak-valley information of a plurality of carrier signals in time domain may be understood as that each baseband subunit determines peak-valley information of a time domain signal of a corresponding carrier. For example, the baseband unit shares peak-valley information of time domain signals of carriers corresponding to a plurality of subunits, to ensure that a first baseband subunit in the baseband unit obtains peak-valley information of a time domain signal of a carrier corresponding to a second baseband subunit in the baseband unit.

Step 702: The baseband unit determines offsets of the plurality of carrier signals in time domain based on the peak-valley information of the plurality of carrier signals in time domain.

It is easy to understand that an offset of each carrier signal in time domain may be processed by an independent baseband subunit. That the baseband unit determines offsets of the plurality of carrier signals in time domain may be understood as that each baseband subunit determines an offset of a corresponding carrier signal in time domain.

In an implementation method, one carrier signal is selected from the plurality of carrier signals as a reference carrier signal, and a baseband subunit corresponding to the reference carrier signal may share peak-valley information of the reference carrier signal with other baseband subunits, so that the other baseband subunits can determine, based on the peak-valley information of the reference carrier signal, offsets of carrier signals (also referred to as non-reference carrier signals) corresponding to the other baseband subunits relative to the reference carrier signal in time domain. For the offset in time domain, an additional delay amount (that is, an offset) is introduced to a non-reference carrier signal relative to the reference carrier signal, and time domain cyclic shift is performed on the non-reference carrier signal. Based on the method, peak superposition and/or valley superposition do/does not exist between a non-reference carrier signal and a reference carrier signal, or peak superposition and/or valley superposition are/is reduced, to ensure security of carrier signal sending.

For example, there are five baseband subunits, which are respectively represented as: a baseband subunit 1 (corresponding to a carrier signal 1), a baseband subunit 2 (corresponding to a carrier signal 2), a baseband subunit 3 (corresponding to a carrier signal 3), a baseband subunit 4 (corresponding to a carrier signal 4), and a baseband subunit 5 (corresponding to a carrier signal 5). It is assumed that the carrier signal 1 is selected as the reference carrier signal, and the carrier signal 2 to the carrier signal 5 are non-reference carrier signals. The baseband subunit 1 shares peak-valley information of the carrier signal 1 with the baseband subunit 2 to the baseband subunit 5. Therefore, the baseband subunit 2 may determine an offset of the carrier signal 2 relative to the carrier signal 1 based on the peak-valley information of the carrier signal 1 and peak-valley information of the carrier signal 2, the baseband subunit 3 may determine an offset of the carrier signal 3 relative to the carrier signal 1 based on the peak-valley information of the carrier signal 1 and peak-valley information of the carrier signal 3, the baseband subunit 4 may determine an offset of the carrier signal 4 relative to the carrier signal 1 based on the peak-valley information of the carrier signal 1 and peak-valley information of the carrier signal 4, and the baseband subunit 5 may determine an offset of the carrier signal 5 relative to the carrier signal 1 based on the peak-valley information of the carrier signal 1 and peak-valley information of the carrier signal 5. According to the method, peak-valley superposition between carrier signals can be reduced to some extent, and information exchange between baseband subunits can be reduced as much as possible, so that security of carrier signal sending can be ensured without increasing overheads of the information exchange between the baseband subunits.

A method for determining the time domain offset may be based on a predefined rule, for example, through table lookup or function calculation. Each baseband subunit sends a carrier signal to a radio frequency module based on an offset of a carrier signal in time domain.

For example, a carrier signal 1 and a carrier signal 2 are used as an example. When there is no offset, the carrier signal 1 is represented as $$x(0), x(1), \ldots, x(N-1)$$

in time domain, and the carrier signal 2 is represented as $$y(0), y(1), \ldots, y(N-1)$$

in time domain, where n is a sampling index value, that is, an $n^{th}$ sampling value, and N is a sampling quantity. The carrier signal 1 is used as the reference carrier signal. If an offset is 1, the carrier signal 2 is changed to $$y(n-1), y(0), y(1), \ldots, y(n-2)$$

through cyclic shift in time domain. Similarly, if the offset is m, the carrier signal 2 is changed to $$y(n-m), \ldots, y(n-1), y(0), y(1), \ldots, y(n-m-1)$$

through cyclic shift in time domain.

Step 703: The baseband unit determines a plurality of adjusted carrier signals based on the offsets of the plurality of carrier signals in time domain.

It is easy to understand that each adjusted carrier signal may be processed by an independent baseband subunit. That the baseband unit determines a plurality of adjusted carrier signals may be understood as that each baseband subunit determines an adjusted carrier signal.

After offset adjustment is performed on one or more of the plurality of carrier signals in time domain, the plurality of adjusted carrier signals are obtained. In a possible implementation method, the determining at least two adjusted carrier signals includes reducing peak superposition and/or valley superposition of the at least two carrier signals. It may be understood that relative shift of time domain signals between a plurality of carriers is implemented to reduce a PAPR.

In an implementation method, peak superposition between the plurality of adjusted carrier signals is reduced or reduced compared with peak superposition between the plurality of carrier signals before adjustment.

In an implementation method, valley superposition between the plurality of adjusted carrier signals is reduced or reduced compared with valley superposition between the plurality of carrier signals before adjustment.

The peak superposition may be understood as peak alignment or peak overlapping. Similarly, the valley superposition may be understood as valley alignment or valley overlapping.

Step 704: The baseband unit sends the plurality of adjusted carrier signals to the radio unit.

It is easy to understand that each adjusted carrier signal may be sent by an independent baseband subunit. That the baseband unit sends the plurality of adjusted carrier signals to the radio unit may be understood as that each baseband subunit sends one adjusted carrier signal to the radio unit separately.

According to the foregoing solution, the baseband unit may reduce a PAPR based on relative shifts of the plurality of carrier signals in time domain, to reduce a PAPR of a combined signal of the plurality of carrier signals. In this solution, the baseband unit may reduce a PAPR without introducing non-linear distortion, thereby reducing clipping pressure. In addition, when this solution is combined with any one of the foregoing carrier signal processing methods, carrier signal pre-processing may be performed before clipping, to resolve a problem of communication performance deterioration caused by clipping of a plurality of carrier signals.

FIG. 8 is a schematic diagram of a communication apparatus according to an embodiment of this application. The apparatus is configured to implement steps performed by the corresponding baseband unit or radio unit in the foregoing embodiments. As shown in FIG. 8, the apparatus 800 includes a transceiver unit 810 and a processing unit 820.

In a first embodiment, the communication apparatus is a baseband unit or a chip used in the baseband unit.

The processing unit 820 is configured to determine, based on scheduling information respectively corresponding to at least two carrier signals in a first time unit, clipping factors respectively corresponding to the at least two carrier signals in the first time unit. The transceiver unit 810 is configured to send the at least two carrier signals and the clipping factors respectively corresponding to the at least two carrier signals in the first time unit to a radio unit, where the clipping factors respectively corresponding to the at least two carrier signals in the first time unit are for clipping processing on a combined signal of the at least two carrier signals.

In a possible implementation method, the processing unit 820 is specifically configured to: determine a reference carrier signal in the at least two carrier signals; and determine, based on the scheduling information corresponding to each of the at least two carrier signals in the first time unit and scheduling information corresponding to the reference carrier signal in the first time unit, the clipping factor corresponding to each carrier signal.

In a possible implementation method, the first time unit is a slot, a subframe, or an orthogonal frequency division multiplexing symbol.

In a possible implementation method, the scheduling information includes one or more of a power, a modulation order, and a bandwidth.

In a possible implementation method, $$F_i = P_j/P_i,$$

where $F_i$ represents a clipping factor corresponding to an $i^{th}$ carrier signal in the at least two carrier signals in the first time unit, $P_i$ represents a power of the $i^{h}$ carrier signal in the first time unit, $P_j$ represents a power of a $j^{th}$ carrier signal in the first time unit, the $j^{th}$ carrier signal is the reference carrier signal, and a quantity of the at least two carrier signals is n, where i=1, 2, . . . , n.

In a possible implementation method, $$F_i = EVM_j^2/EVM_i^2,$$

where $F_i$ represents a clipping factor corresponding to an $i^{th}$ carrier signal in the at least two carrier signals in the first time unit, $EVM_i$ represents an error vector magnitude EVM threshold corresponding to a modulation order of the $i^{th}$ carrier signal in the first time unit, $EVM_j$ represents an error vector magnitude EVM threshold corresponding to a modulation order of a $j^{th}$ carrier signal in the first time unit, the $j^{th}$ carrier signal is the reference carrier signal, and a quantity of the at least two carrier signals is n, where i=1, 2, . . . , n.

In a possible implementation method, $$F_1 = (P_j * EVM_j^2)/(P_j * EVM_i^2),$$

where $F_i$ represents a clipping factor corresponding to an $i^{th}$ carrier signal in the at least two carrier signals in the first time unit, $P_i$ represents a power of the $i^{th}$ carrier signal in the first time unit, $P_j$ represents a power of a $j^{th}$ carrier signal in the first time unit, $EVM_i$ represents an error vector magnitude EVM threshold corresponding to a modulation order of the $i^{th}$ carrier signal in the first time unit, $EVM_j$ represents an error vector magnitude EVM threshold corresponding to a modulation order of the $j^{th}$ carrier signal in the first time unit, the $j^{th}$ carrier signal is the reference carrier signal, and a quantity of the at least two carrier signals is n, where i=1, 2, . . . , n.

In a second embodiment, the communication apparatus is a radio unit or a chip used in the radio unit.

The transceiver unit 810 is configured to receive at least two carrier signals and clipping factors respectively corresponding to the at least two carrier signals in a first time unit from a baseband unit, where the clipping factors respectively corresponding to the at least two carrier signals in the first time unit correspond to scheduling information respectively corresponding to the at least two carrier signals in the first time unit. The processing unit 820 is configured to perform clipping processing on a combined signal of the at least two carrier signals based on the clipping factors respectively corresponding to the at least two carrier signals in the first time unit.

In a possible implementation method, the processing unit 820 is further configured to: before performing clipping processing on the combined signal of the at least two carrier signals based on the clipping factors respectively corresponding to the at least two carrier signals in the first time unit, determine that transmission of the clipping factors is reliable.

In a possible implementation method, the first time unit is a slot, a subframe, or an orthogonal frequency division multiplexing symbol.

In a possible implementation method, the scheduling information includes one or more of a power, a modulation order, and a bandwidth.

In a possible implementation, $$F_i = P_j / P_i,$$

where $F_i$ represents a clipping factor corresponding to an $i^{th}$ carrier signal in the at least two carrier signals in the first time unit, $P_i$ represents a power of the $i^{th}$ carrier signal in the first time unit, $P_j$ represents a power of a $j^{th}$ carrier signal in the first time unit, the $j^{th}$ carrier signal is the reference carrier signal, and a quantity of the at least two carrier signals is n, where i=1, 2, . . . , n.

In a possible implementation, $$F_i = EVM_j^2 / EVM_i^2,$$

where $F_i$ represents a clipping factor corresponding to an $i^{th}$ carrier signal in the at least two carrier signals in the first time unit, represents an error vector magnitude EVM threshold corresponding to a modulation order of the $i^{th}$ carrier signal in the first time unit, represents an error vector magnitude EVM threshold corresponding to a modulation order of a $j^{th}$ carrier signal in the first time unit, the $j^{th}$ carrier signal is the reference carrier signal, and a quantity of the at least two carrier signals is n, where i=1, 2, . . . , n.

In a possible implementation method, $$F_i = (P_j * EVM_j^2) / (P_i * EVM_i^2),$$

where $F_i$ represents a clipping factor corresponding to an $i^{th}$ carrier signal in the at least two carrier signals in the first time unit, $P_i$ represents a power of the $i^{th}$ carrier signal in the first time unit, $P_j$ represents a power of a $j^{th}$ carrier signal in the first time unit, represents an error vector magnitude EVM threshold corresponding to a modulation order of the $i^{th}$ carrier signal in the first time unit, represents an error vector magnitude EVM threshold corresponding to a modulation order of the $j^{th}$ carrier signal in the first time unit, the $j^{th}$ carrier signal is the reference carrier signal, and a quantity of the at least two carrier signals is n, where i=1, 2, . . . , n.

In a third embodiment, the communication apparatus is a baseband unit or a chip used in the baseband unit.

The processing unit 820 is configured to: determine, based on scheduling information respectively corresponding to at least two carrier signals in a first time unit and second clipping factors respectively corresponding to the at least two carrier signals in a second time unit, first clipping factors respectively corresponding to the at least two carrier signals in the first time unit, where the first time unit is included in the second time unit; and perform separate clipping processing on each of the at least two carrier signals based on the first clipping factors respectively corresponding to the at least two carrier signals in the first time unit. The transceiver unit 810 is configured to send at least two clipping-processed carrier signals to a radio unit, where the second clipping factors are for performing clipping processing on a combined signal of the at least two clipping-processed carrier signals.

In a possible implementation method, that the processing unit 820 is configured to determine, based on scheduling information respectively corresponding to at least two carrier signals in a first time unit and second clipping factors respectively corresponding to the at least two carrier signals in a second time unit, first clipping factors respectively corresponding to the at least two carrier signals in the first time unit specifically includes: The processing unit is configured to: determine a reference carrier signal in the at least two carrier signals; and determine, based on the scheduling information corresponding to each of the at least two carrier signals in the first time unit, scheduling information corresponding to the reference carrier signal in the first time unit, and the second clipping factors respectively corresponding to the at least two carrier signals in the second time unit, the first clipping factor corresponding to each carrier signal.

In a possible implementation method, the transceiver unit 810 is further configured to receive the second clipping factors respectively corresponding to the at least two carrier signals in the second time unit from the radio unit.

In a possible implementation method, the processing unit 820 is further configured to determine the second clipping factor corresponding to each carrier signal in the second time unit.

In a possible implementation method, that the processing unit 820 is configured to determine the second clipping factor corresponding to each carrier signal in the second time unit specifically includes: the processing unit is configured to determine, based on a plurality of third clipping factors corresponding to each of the at least two carrier signals in a third time unit, the second clipping factor corresponding to each carrier signal in the second time unit, where the third time unit is earlier than the second time unit in a time sequence.

In a possible implementation method, the transceiver unit 810 is further configured to send the second clipping factors respectively corresponding to the at least two carrier signals in the second time unit to the radio unit.

In a possible implementation method, the first time unit is a slot, a subframe, or an orthogonal frequency division multiplexing symbol.

In a possible implementation method, the scheduling information includes at least one of a power, a modulation order, and a bandwidth.

In a possible implementation method, the second time unit includes m first time units, and a quantity of the at least two carrier signals is n; and $$F_{i,j}^1 = P_{k,j}^1 / P_{i,j}^1 / F_i^2,$$

where $$F_{i,j}^1$$

represents a first clipping factor corresponding to an $i^{th}$ carrier signal in the at least two carrier signals in a $j^{th}$ first time unit in the second time unit, $$F_i^2$$

represents a second clipping factor corresponding to the $i^{th}$ carrier signal in the second time unit, $$P_{i,j}^1$$

represents a power of the $i^{th}$ carrier signal in the $j^{th}$ first time unit in the second time unit, $$P_{k,j}^1$$

represents a power of a $k^{th}$ carrier signal in the $j^{th}$ first time unit in the second time unit, and the k carrier signal is the reference carrier signal, where i=1, 2, . . . , n, and j=1, 2, . . . , m.

In a possible implementation method, the second time unit includes m first time units, and a quantity of the at least two carrier signals is n; and $$F_{i,j}^1 = (EVM_{k,j}^2)^2 / (EVM_{i,j}^2)^2 / F_i^2,$$

where $$F_{i,j}^1$$

represents a first clipping factor corresponding to an $i^{th}$ carrier signal in the at least two carrier signals in a $j^{th}$ first time unit in the second time unit, $$F_i^2$$

represents a second clipping factor corresponding to the $i^{th}$ carrier signal in the second time unit, $$EVM_{i,j}^1$$

represents an EVM threshold corresponding to a modulation order of the $i^{th}$ carrier signal in the $j^{th}$ first time unit in the second time unit, $$EVM_{k,j}^1$$

represents an EVM threshold corresponding to a modulation order of a $k^{th}$ carrier signal in the $j^{th}$ first time unit in the second time unit, and the $k^{th}$ carrier signal is the reference carrier signal, where i=1, 2, . . . , n, and j=1, 2, . . . , m.

In a possible implementation method, the second time unit includes m first time units, and a quantity of the at least two carrier signals is n; and $$F_{i,j}^1 = (P_{k,j}^1 * (EVM_{k,j}^1)^2) / (P_{i,j}^1 * (EVM_{i,j}^1)^2) / F_i^2,$$

where $$F_{i,j}^1$$

represents a first clipping factor corresponding to an $i^{th}$ carrier signal in the at least two carrier signals in a $j^{th}$ first time unit in the second time unit, $$F_i^2$$

represents a second clipping factor corresponding to the $i^{th}$ carrier signal in the second time unit, $$P_{i,j}^1$$

represents a power of the $i^{th}$ carrier signal in the $j^{th}$ first time unit in the second time unit, $$P_{k,j}^1$$

represents a power of a $k^{th}$ carrier signal in the $j^{th}$ first time unit in the second time unit, $$EVM_{i,j}^1$$

represents an EVM threshold corresponding to a modulation order of the $i^{th}$ carrier signal in the $j^{th}$ first time unit in the second time unit, $$EVM^1_{k,j}$$

represents an EVM threshold corresponding to a modulation order of the $k^{th}$ carrier signal in the $j^{th}$ first time unit in the second time unit, and the k carrier signal is the reference carrier signal, where i=1, 2, . . . , n, and j=1, 2, . . . , m.

In a fourth embodiment, the communication apparatus is a radio unit or a chip used in the radio unit.

The transceiver unit 810 is configured to receive at least two clipping-processed carrier signals from a baseband unit, where the at least two clipping-processed carrier signals are carrier signals obtained by performing separate clipping processing based on first clipping factors respectively corresponding to at least two carrier signals in a first time unit, and the first clipping factors are determined based on scheduling information respectively corresponding to the at least two carrier signals in the first time unit and second clipping factors respectively corresponding to the at least two carrier signals in a second time unit, where the first time unit is included in the second time unit. The processing unit 820 is configured to perform clipping processing on a combined signal of the at least two clipping-processed carrier signals based on the second clipping factors respectively corresponding to the at least two carrier signals in the second time unit.

In a possible implementation method, the processing unit 820 is further configured to determine the second clipping factor corresponding to each carrier signal in the second time unit.

In a possible implementation method, that the processing unit 820 is configured to determine the second clipping factor corresponding to each carrier signal in the second time unit specifically includes: The processing unit is configured to determine, as the second clipping factor corresponding to each carrier signal in the second time unit, an average value or a maximum value of a plurality of third clipping factors corresponding to each of the at least two carrier signals in a third time unit, where the third time unit is earlier than the second time unit in a time sequence.

In a possible implementation method, the transceiver unit 810 is further configured to: before receiving the at least two clipping-processed carrier signals from the baseband unit, send the second clipping factors respectively corresponding to the at least two carrier signals in the second time unit to the baseband unit.

In a possible implementation method, the transceiver unit 810 is further configured to receive the second clipping factors respectively corresponding to the at least two carrier signals in the second time unit from the baseband unit.

In a possible implementation method, the first time unit is a slot, a subframe, or an orthogonal frequency division multiplexing symbol.

In a possible implementation method, the scheduling information includes at least one of a power, a modulation order, and a bandwidth.

In a possible implementation method, the second time unit includes m first time units, and a quantity of the at least two carrier signals is n; and $$F^1_{i,j} = P^1_{k,j}/P^1_{i,j}/F^2_i,$$

where $$F^1_{i,j}$$

represents a first clipping factor corresponding to an $i^{th}$ carrier signal in the at least two carrier signals in a $j^{th}$ first time unit in the second time unit, $$F^2_1$$

represents a second clipping factor corresponding to the $i^{th}$ carrier signal in the second time unit, $$P^1_{i,j}$$

represents a power of the $i^{th}$ carrier signal in the $j^{th}$ first time unit in the second time unit, $$P^1_{k,j}$$

represents a power of a $k^{th}$ carrier signal in the $j^{th}$ first time unit in the second time unit, and the k carrier signal is the reference carrier signal, where i=1, 2, . . . , n, and j=1, 2, . . . , m.

In a possible implementation method, the second time unit includes m first time units, and a quantity of the at least two carrier signals is n; and $$F^1_{i,j} = (EVM^1_{k,j})^2/(EVM^1_{i,j})^2/F^2_i,$$

where $$F^1_{i,j}$$

represents a first clipping factor corresponding to an $i^{th}$ carrier signal in the at least two carrier signals in a $j^{th}$ first time unit in the second time unit, $$F^2_1$$

represents a second clipping factor corresponding to the $i^{th}$ carrier signal in the second time unit, $$EVM^1_{i,j}$$

represents an EVM threshold corresponding to a modulation order of the $i^{th}$ carrier signal in the $j^{th}$ first time unit in the second time unit, $$EVM^1_{k,j}$$

represents an EVM threshold corresponding to a modulation order of a $k^{th}$ carrier signal in the $j^{th}$ first time unit in the second time unit, and the k carrier signal is the reference carrier signal, where i=1, 2, . . . , n, and j=1, 2, . . . , m.

In a possible implementation method, the second time unit includes m first time units, and a quantity of the at least two carrier signals is n; and $$F_{i,j}^{1}=(P_{k,j}^{1}*(EVM_{k,j}^{1})^{2})/(P_{i,j}^{1}*(EVM_{i,j}^{1})^{2})/F_{i}^{2},$$

where $$F_{i,j}^{1}$$

represents a first clipping factor corresponding to an $i^{th}$ carrier signal in the at least two carrier signals in a $j^{th}$ first time unit in the second time unit, $$F_{1}^{2}$$

represents a second clipping factor corresponding to the $i^{th}$ carrier signal in the second time unit, $$P_{i,j}^{1}$$

represents a power of the $i^{th}$ carrier signal in the $j^{th}$ first time unit in the second time unit, $$P_{k,j}^{1}$$

represents a power of a $k^{th}$ carrier signal in the $j^{th}$ first time unit in the second time unit, $$EVM_{i,j}^{1}$$

represents an EVM threshold corresponding to a modulation order of the $i^{th}$ carrier signal in the $j^{th}$ first time unit in the second time unit, $$EVM_{k,j}^{1}$$

represents an EVM threshold corresponding to a modulation order of the $k^{th}$ carrier signal in the $j^{th}$ first time unit in the second time unit, and the $k^{th}$ carrier signal is the reference carrier signal, where i=1, 2, . . . , n, and j=1, 2, . . . , m.

In a fifth embodiment, the communication apparatus is a baseband unit or a chip used in the baseband unit.

The processing unit 820 is configured to: determine peak-valley information of at least two carrier signals in time domain, where the peak-valley information includes peak information and/or valley information; determine offsets of the at least two carrier signals in time domain based on the peak-valley information of the at least two carrier signals in time domain; and determine at least two adjusted carrier signals based on the offsets of the at least two carrier signals in time domain. The transceiver unit 810 is configured to send the at least two adjusted carrier signals to a radio unit.

In a possible implementation method, peak superposition and/or valley superposition do/does not exist on or peak superposition and/or valley superposition are/is reduced for any two of the at least two adjusted carrier signals.

In a possible implementation method, that the processing unit 820 is configured to determine offsets of the at least two carrier signals in time domain based on the peak-valley information of the at least two carrier signals in time domain specifically includes: The processing unit is configured to: determine a reference carrier signal in the at least two carrier signals; and determine, based on peak-valley information of the reference carrier signal, an offset of a non-reference carrier signal in the at least two carrier signals relative to the reference carrier signal in time domain.

Optionally, the communication apparatus 800 may further include a storage unit. The storage unit is configured to store data or instructions (which may also be referred to as code or a program). The foregoing units may interact with or be coupled to the storage unit, to implement a corresponding method or function. For example, the processing unit 820 may read the data or the instructions in the storage unit, so that the communication apparatus implements the methods in the foregoing embodiments.

It should be understood that division of units in the apparatus is merely logical function division. During actual implementation, all or some of the units may be integrated into one physical entity or may be physically separated. In addition, all the units in the apparatus may be implemented in a form in which a processing element invokes software, or may be implemented in a form of hardware; or some units may be implemented in a form in which a processing element invokes software, and some units are implemented in a form of hardware. For example, each unit may be a separately disposed processing element, or may be integrated into a chip of the apparatus for implementation. In addition, each unit may alternatively be stored in a memory in a form of a program to be invoked by a processing element of the apparatus to perform a function of the unit. In addition, all or some of the units may be integrated, or may be implemented independently. The processing element herein may also be referred to as a processor, and may be an integrated circuit having a signal processing capability. During implementation, steps in the foregoing methods or the foregoing units may be implemented by using a hardware integrated logic circuit in a processor element, or may be implemented in the form of software invoked by the processing element.

In an example, the unit in any one of the foregoing apparatuses may be one or more integrated circuits configured to implement the foregoing method, for example, one or more application-specific integrated circuits (application-specific integrated circuits, ASICs), or one or more microprocessors (digital signal processors, DSPs), or one or more field programmable gate arrays (field programmable gate arrays, FPGAs), or a combination of at least two of these integrated circuit forms. For another example, when the units in the apparatus may be implemented in a form of scheduling a program by the processing element, the processing element may be a general-purpose processor, for example, a central processing unit (central processing unit, CPU) or another processor that can invoke the program. For still another example, the units may be integrated and implemented in a form of a system-on-a-chip (system-on-a-chip, SOC).

The transceiver unit 810 may be an interface circuit of the apparatus, and is configured to receive a signal from another apparatus or send a signal to another apparatus. For example, when the apparatus is implemented as a chip, the transceiver unit 810 is an interface circuit, of the chip, that is configured to receive a signal from another chip or apparatus, or an interface circuit configured to send a signal to another chip or apparatus.

Figure 9:
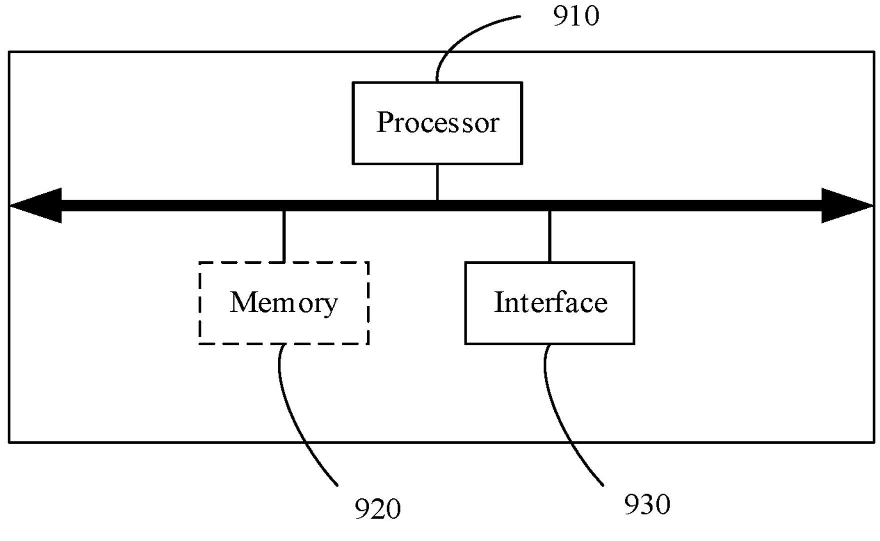
FIG. 9 is a schematic diagram of another communication apparatus according to an embodiment of this application.

FIG. 9 is a schematic diagram of a communication apparatus according to an embodiment of this application. The communication apparatus is configured to implement operations of the baseband unit or the radio unit in the foregoing embodiments. As shown in FIG. 9, the communication apparatus includes a processor 910 and an interface 930. Optionally, the communication apparatus further includes a memory 920. The interface 930 is configured to communicate with another device.

The method performed by the baseband unit or the radio unit in the foregoing embodiments may be implemented by the processor 910 by invoking a program stored in a memory (which may be the memory 920 in the baseband unit or the radio unit, or may be an external memory). That is, the baseband unit or the radio unit may include the processor 910. The processor 910 invokes the program in the memory, to perform the method performed by the baseband unit or the radio unit in the foregoing method embodiments. The processor herein may be an integrated circuit having a signal processing capability, for example, a CPU. The baseband unit or the radio unit may be implemented by configuring one or more integrated circuits for implementing the foregoing methods, for example, one or more ASICs, one or more microprocessors DSPs, one or more FPGAs, or a combination of at least two of the integrated circuit forms. Alternatively, the foregoing implementations may be combined.

Specifically, functions/implementation processes of the transceiver unit 810 and the processing unit 820 in FIG. 8 may be implemented by the processor 910 in the communication apparatus 900 shown in FIG. 9 by invoking computer-executable instructions stored in the memory 920. Alternatively, a function/an implementation process of the processing unit 820 in FIG. 8 may be implemented by the processor 910 in the communication apparatus 900 shown in FIG. 9 by invoking computer-executable instructions stored in the memory 920, and a function/an implementation process of the transceiver unit 810 in FIG. 8 may be implemented by the interface 930 in the communication apparatus 900 shown in FIG. 9.

A person of ordinary skill in the art may understand that various numbers such as "first" and "second" in this application are merely used for differentiation for ease of description, and are not used to limit the scope of embodiments of this application or represent a sequence. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. "At least one" means one or more. "At least two" means two or more. "At least one", "any one", or a similar expression thereof indicates any combination of the items, and includes a singular item (piece) or any combination of plural items (pieces). For example, at least one (piece or type) of a, b, or c may indicate: a, b, c, a and b, a and c, b and c, or a, b, and c, where a, b, and c may be singular or plural. The term "a plurality of" means two or more, and another quantifier is similar to this.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

In an implementation method, an embodiment of this application provides a communication apparatus. The apparatus may be a baseband unit, or may be a chip used in the baseband unit. The apparatus has a function of implementing the baseband unit in any one of the foregoing embodiments. The function may be implemented by hardware, or may be implemented by hardware executing corresponding software. The hardware or the software includes one or more modules corresponding to the function.

In an implementation method, an embodiment of this application provides a communication apparatus. The apparatus may be a radio unit, or may be a chip used in the radio unit. The apparatus has a function of implementing the radio unit in any one of the foregoing embodiments. The function may be implemented by hardware, or may be implemented by hardware executing corresponding software. The hardware or the software includes one or more modules corresponding to the function.

In an implementation method, an embodiment of this application provides a communication apparatus, including a processor and a memory. The memory is configured to store computer-executable instructions. When the apparatus runs, the processor executes the computer-executable instructions stored in the memory, so that the apparatus performs the method performed by the baseband unit in any one of the foregoing embodiments.

In an implementation method, an embodiment of this application provides a communication apparatus, including a processor and a memory. The memory is configured to store computer-executable instructions. When the apparatus runs, the processor executes the computer-executable instructions stored in the memory, so that the apparatus performs the method performed by the radio unit in any one of the foregoing embodiments.

In an implementation method, an embodiment of this application provides a communication apparatus, including a unit or means configured to perform steps of the method performed by the baseband unit in any one of the foregoing embodiments.

In an implementation method, an embodiment of this application provides a communication apparatus, including a unit or means configured to perform steps of the method performed by the radio unit in any one of the foregoing embodiments.

In an implementation method, an embodiment of this application provides a communication apparatus, including a processor and an interface circuit. The processor is configured to: communicate with another apparatus through the interface circuit, and perform the method performed by the baseband unit in any one of the foregoing embodiments. There are one or more processors.

In an implementation method, an embodiment of this application provides a communication apparatus, including a processor and an interface circuit. The processor is configured to: communicate with another apparatus through the interface circuit, and perform the method performed by the radio unit in any one of the foregoing embodiments. There are one or more processors.

In an implementation method, an embodiment of this application provides a communication apparatus, including a processor, connected to a memory, and configured to invoke a program stored in the memory, to perform the method performed by the baseband unit in any one of the foregoing embodiments. The memory may be located inside or outside the apparatus. There are one or more processors.

In an implementation method, an embodiment of this application provides a communication apparatus, including a processor, connected to a memory, and configured to invoke a program stored in the memory, to perform the method performed by the radio unit in any one of the foregoing embodiments. The memory may be located inside or outside the apparatus. There are one or more processors.

In an implementation method, an embodiment of this application further provides a computer-readable storage medium. The computer-readable storage medium stores instructions. When the instructions are run on a computer, the method in any one of the foregoing embodiments is performed.

In an implementation method, an embodiment of this application further provides a computer program product. The computer product includes a computer program. When the computer program is run, the method in any one of the foregoing embodiments is performed.

In an implementation method, an embodiment of this application further provides a chip system, including a processor, configured to perform the method performed by the baseband unit in any one of the foregoing embodiments.

In an implementation method, an embodiment of this application further provides a chip system, including a processor, configured to perform the method performed by the radio unit in any one of the foregoing embodiments.

In an implementation method, an embodiment of this application further provides a communication system, including the baseband unit in the method in any one of the foregoing embodiments and/or the radio unit in the method in any one of the foregoing embodiments.

It may be clearly understood by a person skilled in the art that for the purpose of convenient and brief description, for a detailed working process of the described system, apparatus, and unit, refer to a corresponding process in the foregoing method embodiments.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (solid state drive, SSD)), or the like.

The various illustrative logical units and circuits in embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, multiple microprocessors, one or more microprocessors with a digital signal processor core, or any other similar configuration.

Steps of the methods or algorithms described in embodiments of this application may be directly embedded into hardware, a software unit executed by a processor, or a combination thereof. The software unit may be stored in a random access memory (Random Access Memory, RAM), a flash memory, a read-only memory (Read-Only Memory, ROM), an EPROM memory, an EEPROM memory, a register, a hard disk, a removable magnetic disk, a CD-ROM, or a storage medium of any other form in the art. Exemplarily, the storage medium may connect to a processor so that the processor may read information from the storage medium and write information to the storage medium. Alternatively, the storage medium may be integrated into a processor. The processor and the storage medium may be disposed in the ASIC.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In one or more example designs, the functions described in this application may be implemented by using hardware, software, firmware, or any combination thereof. If the present disclosure is implemented by software, these functions may be stored in a computer-readable medium or are transmitted to the computer-readable medium in a form of one or more instructions or code. The computer-readable medium is either a computer storage medium or a communication medium that enables a computer program to move from one place to another. The storage medium may be an available medium that may be accessed by any general-purpose or dedicated computer. For example, such a computer-readable medium may include but is not limited to a RAM, a ROM, an EEPROM, a CD-ROM, or another optical disc storage, a disk storage or another magnetic storage apparatus, or any other medium that may be used to bear or store program code, where the program code is in a form of instructions or a data structure or in a form that can be read by a general or special computer or a general or special processor. In addition, any connection may be appropriately defined as a computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in a defined computer-readable medium. The disk (disk) and the disc (disc) include a compact disc, a laser disc, an optical disc, a digital versatile disc (English: Digital Versatile Disc, DVD for short), a floppy disk, and a Blu-ray disc. The disc usually copies data in a magnetic manner, and the disk usually optically copies data in a laser manner. The foregoing combination may also be included in the computer-readable medium.

A person skilled in the art should be aware that in the foregoing one or more examples, functions described in this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium, where the communication medium includes any medium that enables a computer program to be transmitted from one place to another. The storage medium may be any available medium accessible to a general-purpose or a dedicated computer.

In the foregoing specific implementations, the objectives, technical solutions, and beneficial effects of this application are further described in detail. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application. According to the foregoing description of this specification in this application, technologies in the art may use or implement the content of this application. Any modification based on the disclosed content shall be considered obvious in the art. The basic principles described in this application may be applied to other variations without departing from the essence and scope of this application. Therefore, the content disclosed in this application is not limited to the described embodiments and designs but may also be extended to a maximum scope that is consistent with the principles and disclosed new features of this application.

Although this application is described with reference to specific features and embodiments thereof, it is clear that various modifications and combinations may be made to them without departing from the spirit and scope of this application. Correspondingly, the specification and accompanying drawings are merely example description of this application defined by the accompanying claims, and are considered as any of or all modifications, variations, combinations or equivalents that cover the scope of this application. It is clearly that, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A carrier signal processing method, comprising:

determining, based on scheduling information corresponding to at least two respective carrier signals in a first time unit, clipping factors that correspond to the at least two respective carrier signals in the first time unit and are associated with the scheduling information; and sending the at least two carrier signals and the clipping factors to a radio unit, wherein the clipping factors are sent to the radio unit such that the radio unit uses the clipping factors to perform clipping processing on a combination signal of the at least two carrier signals in the first time unit.

2. The method of claim 1, the determining the at least two clipping factors comprising:

determining a first reference carrier signal in the at least two carrier signals as a reference carrier signal; and determining, based on scheduling information corresponding to one or more second carrier signals in the first time unit and scheduling information corresponding to the first carrier signal in the first time unit, one or more clipping factors corresponding to the one or more respective second carrier signals.

3. The method of claim 1, wherein the first time unit is at least one of a slot, a subframe, or an orthogonal frequency division multiplexing symbol, and the scheduling information comprises at least one of a power, a modulation order, or a bandwidth.

4. The method of claim 1, wherein the clipping factors are determined based on a formula $$F_i = P_j/P_i,$$

wherein $F_i$ represents a clipping factor corresponding to an $i^{th}$ carrier signal in the at least two carrier signals in the first time unit, $P_i$ represents a power of the $i^{th}$ carrier signal in the first time unit, $P_i$ represents a power of a $j^{th}$ carrier signal in the first time unit, the $j^{th}$ carrier signal is a reference carrier signal, and a quantity of the at least two carrier signals is n, wherein i=1, 2, . . . , n.

5. The method of claim 1, wherein the clipping factors are determined based on a formula $$F_i = EVM_j^2/EVM_i^2,$$

wherein $F_i$ represents a clipping factor corresponding to an $i^{th}$ carrier signal in the at least two carrier signals in the first time unit, $EVM_i$ represents an error vector magnitude EVM threshold corresponding to a modulation order of the $i^{th}$ carrier signal in the first time unit, $EVM_j$ represents an error vector magnitude EVM threshold corresponding to a modulation order of a $j^{th}$ carrier signal in the first time unit, the $j^{th}$ carrier signal is a reference carrier signal, and a quantity of the at least two carrier signals is n, wherein i=1, 2, . . . , n.

6. The method of claim 1, wherein the clipping factors are determined based on a formula $$F_i = (P_j * EVM_j^2)/(P_i * EVM_i^2),$$

wherein $F_i$ represents a clipping factor corresponding to an $i^{th}$ carrier signal in the at least two carrier signals in the first time unit, $P_i$ represents a power of the $i^{th}$ carrier signal in the first time unit, $P_i$ represents a power of a $j^{th}$ carrier signal in the first time unit, $EVM_i$ represents an error vector magnitude EVM threshold corresponding to a modulation order of the $i^{th}$ carrier signal in the first time unit, $EVM_j$ represents an error vector magnitude EVM threshold corresponding to a modulation order of the $j^{th}$ carrier signal in the first time unit, the $j^{th}$ carrier signal is a reference carrier signal, and a quantity of the at least two carrier signals is n, wherein i=1, 2, . . . , n.

7. A carrier signal processing method, comprising:

determining, based on scheduling information of at least two respective carrier signals in a first time unit and second clipping factors of the at least two respective carrier signals in a second time unit, first clipping factors of the at least two respective carrier signals in the first time unit, wherein the first time unit is included in the second time unit;

performing separate clipping processing on each of the at least two carrier signals based on the first clipping factors, to generate at least two clipping-processed carrier signals; and sending the at least two clipping-processed carrier signals to a radio unit, wherein the second clipping factors are received from the radio unit and used by the radio unit for performing clipping processing on a combined signal of the at least two clipping-processed carrier signals.

8. The method of claim 7, the determining the first clipping factors comprising:

determining a first carrier signal in the at least two carrier signals as a reference carrier signal; and determining, based on the scheduling information of one or more second carrier signals in the first time unit, scheduling information of the first carrier signal in the first time unit, and one or more second clipping factors corresponding to the one or more second carrier signals in the second time unit, one or more first clipping factors corresponding to the one or more second carrier signals.

9. The method according to claim 7, further comprising:

determining, based on a plurality of third clipping factors corresponding to the at least two respective carrier signals in a third time unit, the second clipping factors corresponding to the at least two respective carrier signals in the second time unit, wherein the third time unit is earlier than the second time unit in a time sequence.

10. The method of claim 7, wherein the scheduling information comprises at least one of a power, a modulation order, or a bandwidth.

11. The method of claim 7, wherein the second time unit comprises m first time units, and a quantity of the at least two carrier signals is n; and the first clipping factors are determined based on a formula $$F_{i,j}^1 = P_{k,j}^1 / P_{i,j}^1 / F_i^2,$$

wherein $$F_{i,j}^1$$

represents a first clipping factor corresponding to an $i^{th}$ carrier signal in the at least two carrier signals in a $j^{th}$ first time unit in the second time unit, $$F_i^2$$

represents a second clipping factor corresponding to the $i^{th}$ carrier signal in the second time unit, $$P_{i,j}^1$$

represents a power of $k^{th}$ carrier signal in the $j^{th}$ first time unit in the second time unit, $$P_{k,j}^1$$

represents a power of a $k^{th}$ carrier signal in the $j^{th}$ first time unit in the second time unit, and the $k^{th}$ carrier signal is a reference carrier signal, wherein i=1, 2, . . . , n, and j=1, 2, . . . , m.

12. The method of claim 7, wherein the second time unit comprises m first time units, and a quantity of the at least two carrier signals is n; and the first clipping factors are determined based on a formula $$F_{i,j}^1 = (EVM_{k,j}^1)^2 / (EVM_{i,j}^1)^2 / F_1^2,$$

wherein $$F_{i,j}^1$$

represents a first clipping factor corresponding to an $i^{th}$ carrier signal in the at least two carrier signals in a $j^{th}$ first time unit in the second time unit, $$F_i^2$$

represents a second clipping factor corresponding to the $i^{th}$ carrier signal in the second time unit, $$EVM_{i,j}^1$$

represents an EVM threshold corresponding to a modulation order of the $i^{th}$ carrier signal in the $j^{th}$ first time unit in the second time unit, $$EVM_{k,j}^1$$

represents an EVM threshold corresponding to a modulation order of a $k^{th}$ carrier signal wherein i=1, 2, . . . , n, and j=1, 2, . . . , m.

13. The method of claim 7, wherein the second time unit comprises m first time units, and a quantity of the at least two carrier signals is n; and the first clipping factors are determined based on a formula $$F_{i,j}^{1}=\left(P_{k,j}^{1}*\left(EVM_{k,j}^{1}\right)^{2}\right)/\left(P_{i,j}^{1}*\left(EVM_{i,j}^{1}\right)^{2}\right)/F_{i}^{2},$$

wherein $$F_{i,j}^{1}$$

represents a first clipping factor corresponding to an $i^{th}$ carrier signal in the at least two carrier signals in a $j^{th}$ first time unit in the second time unit, $$F_{i}^{2}$$

represents a second clipping factor corresponding to the $i^{th}$ carrier signal in the second time unit, $$P_{i,j}^{1}$$

represents a power of the $i^{th}$ carrier signal in the $j^{th}$ first time unit in the second time unit, $$P_{k,j}^{1}$$

represents a power of a $k^{th}$ carrier signal in the $j^{th}$ first time unit in the second time unit, $$EVM_{i,j}^{1}$$

represents an EVM threshold corresponding to a modulation order of the $i^{th}$ carrier signal in the $j^{th}$ first time unit in the second time unit, $$EVM_{k,j}^{1}$$

represents an EVM threshold corresponding to a modulation order of the $k^{th}$ carrier signal in the $j^{th}$ first time unit in the second time unit, the $k^{th}$ carrier signal is a reference carrier signal, wherein i=1, 2, . . . , n, and j=1, 2, . . . , m.

14. A communication apparatus, comprising:

a processing unit, configured to determine, based on scheduling information corresponding to at least two respective carrier signals in a first time unit, clipping factors that correspond to the at least two respective carrier signals in the first time unit and is associated with the scheduling information; and a transceiver unit, configured to send the at least two carrier signals and the clipping factors to a radio unit, wherein the clipping factors are sent to the radio unit such that the radio unit uses the clipping factors to perform clipping processing on a combination signal of the at least two carrier signals in the first time unit.

15. The apparatus of claim 14, wherein the processing unit is configured to:

determine a first carrier signal in the at least two carrier signals as a reference carrier signal; and determine, based on scheduling information corresponding to one or more second carrier signals in the first time unit and scheduling information corresponding to the first carrier signal in the first time unit, one or more clipping factors corresponding to the one or more second carrier signals.

16. The communication apparatus of claim 14, wherein the clipping factors are determined based on a formula $$F_i=P_j/P_i,$$

wherein $F_i$ represents a clipping factor corresponding to an $i^{th}$ carrier signal in the at least two carrier signals in the first time unit, $P_i$ represents a power of the $i^{th}$ carrier signal in the first time unit, $P_i$ represents a power of a $j^{th}$ carrier signal in the first time unit, the $j^{th}$ carrier signal is a reference carrier signal, and a quantity of the at least two carrier signals is n, wherein i=1, 2, . . . , n.

17. The communication apparatus of claim 14, wherein the clipping factors are determined based on a formula $$F_i=P_j/P_i \text{ or } F_i=EVM_j^2/EVM_i^2,$$

wherein $F_i$ represents a clipping factor corresponding to an $i^{th}$ carrier signal in the at least two carrier signals in the first time unit, $EVM_i$ represents an error vector magnitude EVM threshold corresponding to a modulation order of the $i^{th}$ carrier signal in the first time unit, $EVM_j$ represents an error vector magnitude EVM threshold corresponding to a modulation order of a $j^{th}$ carrier signal in the first time unit, the $j^{th}$ carrier signal is a reference carrier signal, and a quantity of the at least two carrier signals is n, wherein i=1, 2, . . . , n; and wherein $P_i$ represents a power of the $i^{th}$ carrier signal in the first time unit, $P_i$ represents a power of a $j^{th}$ carrier signal in the first time unit.

18. A communication apparatus, comprising:

a storage configured to storage program instructions;

a processing unit, coupled to the storage and configured to execute the program instructions to cause the communication apparatus to:

determine, based on scheduling information of at least two respective carrier signals in a first time unit and second clipping factors of the at least two respective carrier signals in a second time unit, first clipping factors of the at least two respective carrier signals in the first time unit, wherein the first time unit is included in the second time unit; and perform separate clipping processing on each of the at least two carrier signals based on the first clipping factors, to generate at least two clipping-processed carrier signals; and sending the at least two clipping-processed carrier signals to a radio unit, wherein the second clipping factors are received from the radio unit and used by the radio unit for performing clipping processing on a combined signal of the at least two clipping-processed carrier signals.

19. The communication apparatus of claim 18, wherein the second time unit comprises m first time units, and a quantity of the at least two carrier signals is n; and the first clipping factors are determined based on a formula $$F_{i,j}^{1}=P_{k,j}^{1}/P_{i,j}^{1}/F_{i}^{2},$$

wherein $$F_{i,j}^{1}$$

represents a first clipping factor corresponding to an $i^{th}$ carrier signal in the at least two carrier signals in a $j^{th}$ first time unit in the second time unit, $$F_{i}^{2}$$

represents a second clipping factor corresponding to the $i^{th}$ carrier signal in the second time unit, $$P_{i,j}^{1}$$

represents a power of the $i^{th}$ carrier signal in the $j^{th}$ first time unit in the second time unit, $$P_{k,j}^{1}$$

represents a power of a $k^{th}$ carrier signal in the $j^{th}$ first time unit in the second time unit, and the $k^{th}$ carrier signal is a reference carrier signal, wherein i=1, 2, . . . , n, and j=1, 2, . . . , m.

20. The communication apparatus of claim 18 wherein the second time unit comprises m first time units, and a quantity of the at least two carrier signals is n; and the first clipping factors are determined based on a formula $$F_{i,j}^{1}=\left(EVM_{k,j}^{1}\right)^{2}/\left(EVM_{i,j}^{1}\right)^{2}/F_{i}^{2} \text{ or}$$

-continued $$F_{i,j}^{1}=\left(P_{k,j}^{1}*\left(EVM_{k,j}^{1}\right)^{2}\right)/\left(P_{i,j}^{1}*\left(EVM_{i,j}^{1}\right)^{2}\right)/F_{i}^{2}$$

wherein $$F_{i,j}^{1}$$

represents a first clipping factor corresponding to an $i^{th}$ carrier signal in the at least two carrier signals in a $j^{th}$ first time unit in the second time unit, $$F_{i}^{2}$$

represents a second clipping factor corresponding to the $i^{th}$ carrier signal in the second time unit, $$EVM_{i,j}^{1}$$

represents a second clipping threshold corresponding to a modulation order of the $i^{th}$ carrier signal in the $j^{th}$ first time unit in the second time unit, $$EVM_{k,j}^{1}$$

represents an EVM threshold corresponding to a modulation order of a $k^{th}$ carrier signal in the $j^{th}$ first time unit in the second time unit, and the $k^{th}$ carrier signal is a reference carrier signal, wherein i=1, 2, . . . , n, and j=1, 2, . . . , m; and wherein $$P_{i,j}^{1}$$

represents a power of the $i^{th}$ carrier signal in the $j^{th}$ first time unit in the second time unit, $$P_{k,j}^{1}$$

represents a power of a $k^{th}$ carrier signal in the $j^{th}$ first time unit in the second time unit.

* * * * *